United States Patent
Awazu

(10) Patent No.: US 8,218,019 B2
(45) Date of Patent: Jul. 10, 2012

(54) IMAGE SHAKE CORRECTION APPARATUS AND IMAGE PICKUP APPARATUS

(75) Inventor: Kouhei Awazu, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 68 days.

(21) Appl. No.: 12/829,598

(22) Filed: Jul. 2, 2010

(65) Prior Publication Data
US 2011/0001835 A1    Jan. 6, 2011

(30) Foreign Application Priority Data
Jul. 6, 2009   (JP) ................................. 2009-159829

(51) Int. Cl.
H04N 5/228   (2006.01)

(52) U.S. Cl. ................................................ 348/208.99

(58) Field of Classification Search ............. 348/208.99, 348/208.4, 208.11
See application file for complete search history.

(56) References Cited

U.S. PATENT DOCUMENTS

| | | | |
|---|---|---|---|
| 5,266,988 A | 11/1993 | Washisu | |
| 7,437,064 B2 * | 10/2008 | Seo | 396/75 |
| 7,536,091 B2 * | 5/2009 | Nomura et al. | 396/55 |
| 2007/0182825 A1 * | 8/2007 | Nomura et al. | 348/208.99 |
| 2007/0257989 A1 * | 11/2007 | Shirono | 348/208.99 |
| 2009/0202233 A1 * | 8/2009 | Byon et al. | 396/55 |
| 2009/0251552 A1 * | 10/2009 | Homme et al. | 348/208.4 |
| 2010/0322607 A1 * | 12/2010 | Kuroda et al. | 396/55 |

FOREIGN PATENT DOCUMENTS

| | | |
|---|---|---|
| JP | 2720955 B2 | 8/1991 |
| JP | 2005-333181 A | 12/2005 |

* cited by examiner

Primary Examiner — James Hannett
(74) Attorney, Agent, or Firm — Sughrue Mion, PLLC

(57) ABSTRACT

An image shake correction apparatus, comprising:
a correction optical system which corrects a camera shake;
a moving member in which the correction optical system is provided;
two first guide shafts by which the moving member is held so as to be movable in parallel with a first direction perpendicular to an optical axis;
a first voice coil motor which is provided at the moving member and which moves the moving member in the first direction;
a slider to which the two first guide shafts are fixed;
two second guide shafts by which the slider is held so as to be movable in parallel with a second direction perpendicular to the optical axis and the first direction; and
a second voice coil motor which is provided at the moving member and which moves the slider in the second direction,
wherein the second voice coil motor is provided substantially on the extension line of at least one of the two first guide shafts.

9 Claims, 18 Drawing Sheets

C-C

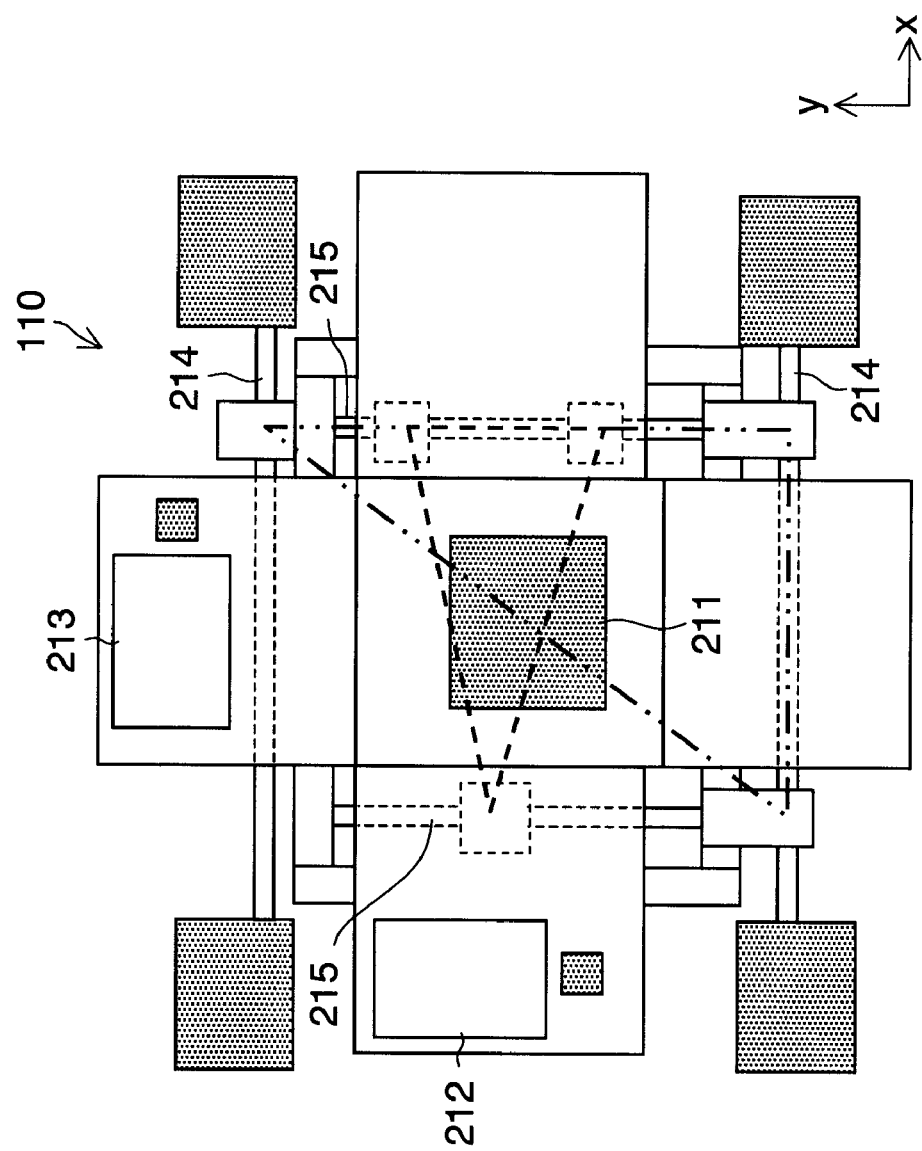

IMAGE SHAKE CORRECTION APPARATUS AND IMAGE PICKUP APPARATUS

BACKGROUND OF THE INVENTION

1. Field of the Invention

The present invention relates to an image shake correction apparatus and an image pickup apparatus, and more particularly relates to an image shake correction apparatus and an image pickup apparatus which use a voice coil motor.

2. Description of the Related Art

As a technique for correcting an image shake due to a camera vibration, such as a camera shake, an image shake correction apparatus using an impact actuator is described in Japanese Patent Application Laid-Open No. 2005-333181. Further, an image shake correction apparatus using a voice coil motor is described in Japanese Examined Application Publication No. 2720955.

However, the image shake correction apparatus using the impact actuator, as described in Japanese Patent Application Laid-Open No. 2005-333181, may not be able to obtain sufficient vibration isolation performance.

On the other hand, the image shake correction apparatus using the voice coil motor, as described in Japanese Examined Application Publication No. 2720955, has sufficient anti-vibration performance but has a problem that the apparatus as a whole is enlarged.

FIG. 16 is a view showing a schematic configuration of an image shake correction apparatus 100 described in Japanese Examined Application Publication No. 2720955. When a voice coil motor 202 is driven, a bearing 205 formed integrally with a correction lens 201 is moved in the x direction along a shaft 204, so that the correction lens 201 is moved in the x direction. When a voice coil motor 203 is driven, a bearing 207 formed integrally with the correction lens 201 is moved in the y direction along a shaft 206, so that the correction lens 201 is moved in the y direction.

In FIG. 16, since the voice coil motor 203 and the shaft 204 are arranged side by side in the y direction and since the voice coil motor 202 and the shaft 206 are arranged side by side in the x direction, the apparatus as a whole is enlarged. When the apparatus as a whole is enlarged, the weight of the apparatus is increased, and hence a powerful and large voice coil motor needs to be used. This results in problems that the cost of the apparatus is increased and that the anti-vibration performance is also deteriorated.

FIG. 17 is a view showing a schematic configuration of an image shake correction apparatus 110 which is another conventional embodiment. When a voice coil motor 212 is driven, an image pickup element 211 is moved in the x direction along a shaft 214. When a voice coil motor 213 is driven, the image pickup element 211 is moved in the y direction. In FIG. 17, the voice coil motor 212 is arranged on the outer side of a shaft 215, and the voice coil motor 213 is arranged on the outer side of the shaft 214. Thus, the apparatus as a whole is enlarged by the amount corresponding to the voice coil motors 212 and 213. In addition to the problem, in the embodiment shown in FIG. 17, the heavy voice coil motors 212 and 213 are arranged on the outer side of the shafts 214 and 215. Thus, there is also a problem that the stability of the apparatus is insufficient and hence the anti-vibration performance is deteriorated.

SUMMARY OF THE INVENTION

The present invention has been made in view of the above described circumstances. An object of the present invention is to provide an image shake correction apparatus and an image pickup apparatus, which can be reduced in size and can improve the anti-vibration performance.

An image shake correction apparatus according to a first aspect of the present invention is featured by including: a correction optical system which corrects a camera shake; a moving member in which the correction optical system is provided; two first guide shafts by which the moving member is held so as to be movable in parallel with a first direction perpendicular to an optical axis; a first voice coil motor which is provided at the moving member and which moves the moving member in the first direction; a slider to which the two first guide shafts are fixed; two second guide shafts by which the slider is held so as to be movable in parallel with a second direction perpendicular to the optical axis and the first direction; and a second voice coil motor which is provided at the moving member and which moves the slider in the second direction, and is featured in that the second voice coil motor is provided substantially on the extension line of at least one of the two first guide shafts.

In the image shake correction apparatus according to the first aspect of the present invention, the second voice coil motor, which moves the slider in the second direction, is provided substantially on the extension line of at least one of the two first guide shafts by which the moving member is held so as to be movable in parallel with the first direction perpendicular to the optical axis. Thereby, the apparatus can be reduced in size by the amount corresponding to the first guide shaft. Further, since the apparatus is reduced in size, the frictional force, and the like, is reduced, so that the anti-vibration performance can be improved.

An image shake correction apparatus according to a second aspect of the present invention is featured in that in the image shake correction apparatus according to the first aspect, the first voice coil motor is provided substantially on the extension line of at least one of the two second guide shafts.

In the image shake correction apparatus according to the second aspect, the two first guide shafts, by which the moving member provided with the correction optical system is held so as to be movable in parallel with the first direction perpendicular to the optical axis, are fixed to the slider. Further, the first voice coil motor, which moves the moving member in the first direction, is provided substantially on the extension line of at least one of the two second guide shafts by which the slider is held so as to be movable in parallel with the second direction perpendicular to the optical axis and the first direction. Thereby, the apparatus can be reduced in size by the amount corresponding to the second guide shaft.

An image shake correction apparatus according to a third aspect of the present invention is featured in that in the image shake correction apparatus according to one of the first and second aspects, the moving member is a substantially L-shaped member configured by a substantially rectangular main body section and by two projecting sections which are respectively formed at the two mutually adjacent sides of the main body section, in that the correction optical system is provided at the main body section, in that the first voice coil motor is provided at one of the two projecting sections, and in that the second voice coil motor is provided at the projecting section at which the first voice coil motor is not provided.

In the image shake correction apparatus according to the third aspect, the moving member is the substantially L-shaped member that is configured by the substantially rectangular main body section provided with the correction optical system and by the two projecting sections which are respectively formed at the two mutually adjacent sides of the main body section, and at which the first and second voice coil motors are respectively provided. With this configuration, the first voice coil motor is provided substantially on the extension line of at least one of the two second guide shafts, and the second voice coil motor is provided substantially on the extension line of at least one of the two first guide shafts. Thereby, the first guide shaft and the second guide shaft can be arranged so as not to overlap with the projecting section. Therefore, the projecting section can be reduced in size, and thereby the moving member can be reduced in size.

An image shake correction apparatus according to a fourth aspect of the present invention is featured in that in the image shake correction apparatus according to the third aspect, a bearing is formed at the moving member so as to face the projecting section at which the second voice coil motor is provided, and in that one of the two first guide shafts is inserted into the bearing.

In the image shake correction apparatus according to the fourth aspect, one of the two first guide shafts is inserted into the bearing that is formed so as to face the projecting section at which the second voice coil motor is provided, and the other first guide shaft is arranged so that the second voice coil motor is positioned on the extension line of the other first guide shaft. Thereby, the first guide shafts are respectively provided on both sides of the main body section. Therefore, the second voice coil motor is positioned on the extension line of one of the bearings into which the first guide shaft is inserted, and the other two bearings are positioned at the moving member. Thus, the size of the triangle formed by connecting the three bearings can be increased. Thereby, the moving member can be stably held and moved.

An image shake correction apparatus according to a fifth aspect of the present invention is featured in that in the image shake correction apparatus according to one of the first to fourth aspect, the slider is formed into a substantially square shape and arranged so as to overlap with the moving member in the optical axis direction.

In the image shake correction apparatus according to the fifth aspect, the substantially square-shaped slider is arranged so as to overlap with the moving member in the optical axis direction. Thereby, the mechanical strength of the slider can be maintained.

An image shake correction apparatus according to a sixth aspect of the present invention is featured in that in the image shake correction apparatus according to the fifth aspect, a first bearing, through which the second guide shaft is inserted to allow the first voice coil motor to be provided substantially on the extension line of the second guide shaft, is formed toward the outer side of one desired side of the slider.

In the image shake correction apparatus according to the sixth aspect, the first bearing, through which the second guide shaft is inserted to allow the first voice coil motor to be provided substantially on the extension line of the second guide shaft, is formed toward the outer side at the one desired side of the slider. Thereby, the second guide shaft can be arranged on the outer side of the slider. Therefore, the slider can be stably held and moved.

An image shake correction apparatus according to a seventh aspect of the present invention is featured in that in the image shake correction apparatus according to one of the first to fourth aspects, the slider is formed into a substantially L-shape and is arranged so as to face the first voice coil motor and the second voice coil motor.

In the image shake correction apparatus according to the seventh aspect, the substantially L-shaped slider is provided so as to face the first voice coil motor and the second voice coil motor. Thereby, the apparatus can be reduced in size by the amount corresponding to the slider.

An image shake correction apparatus according to an eighth aspect of the present invention is featured in that in the image shake correction apparatus according to the seventh aspect, a second bearing, through which the second guide shaft is inserted to allow the first voice coil motor to be provided substantially on the extension line of the second guide shaft, is formed toward the outer side at the tip of one desired side of the slider.

In the image shake correction apparatus according to the eighth aspect, the second bearing, through which the second guide shaft is inserted to allow the first voice motor to be provided substantially on the extension line of the second guide shaft, is provided at the tip of the desired one side of the slider. Thereby, the second guide shaft can be arranged on the outer side of the slider. Therefore, the slider can be stably held and moved.

An image shake correction apparatus according to a ninth aspect of the present invention is featured in that in the image shake correction apparatus according to one of the first to eighth aspects, the correction optical system is an image pickup element.

An image pickup apparatus according to a tenth aspect of the present invention is featured by including the image shake correction apparatus according to the ninth aspect and an imaging optical system which forms a subject image on the image pickup element.

According to the present invention, the image shake correction apparatus can be reduced in size, and the vibration isolation performance of the apparatus can be improved.

BRIEF DESCRIPTION OF THE DRAWINGS

FIGS. 1A and 1B are schematic views of a digital camera 1 according to a first embodiment of the present invention, in which FIG. 1A is a front perspective view of the digital camera 1 and FIG. 1B is a rear perspective view of the digital camera 1;

FIG. 17 is a schematic view of a conventional image shake correction apparatus.

DETAILED DESCRIPTION OF THE PREFERRED EMBODIMENTS

<First Embodiment>

In the following, preferred embodiments of an image shake correction apparatus according to the present invention will be described in detail with reference to accompanying drawings.

Figure 1A:
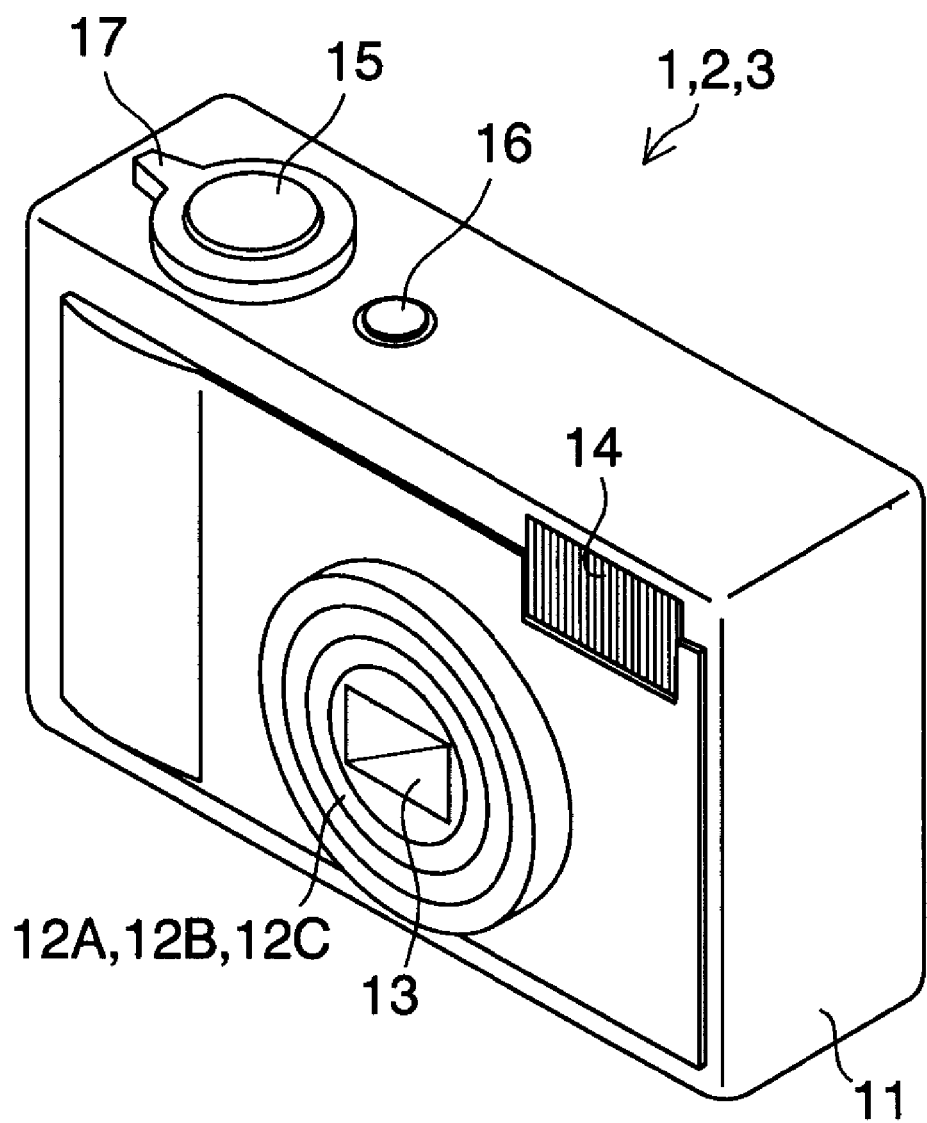
Figure 1B:
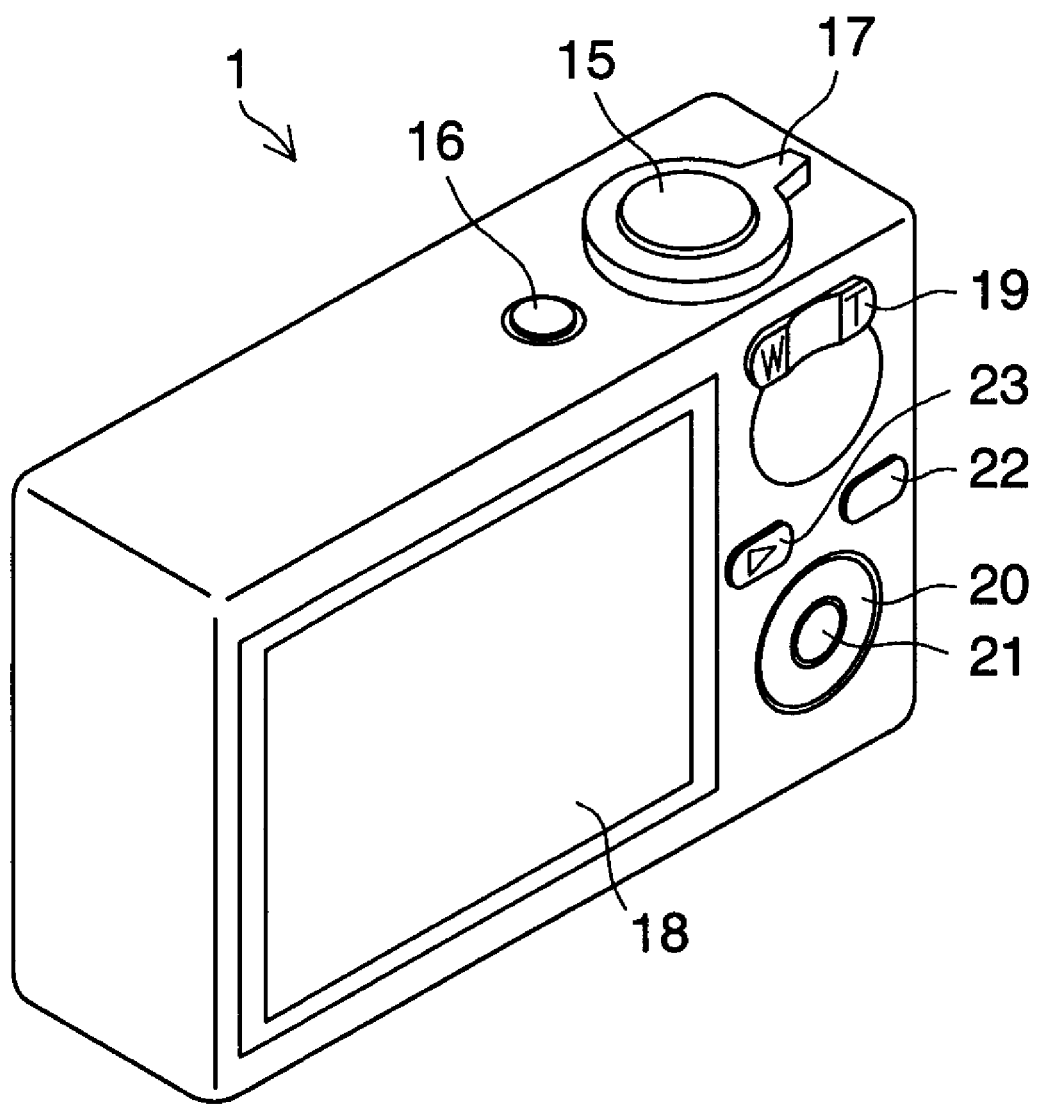

FIGS. 1A and 1B are schematic views of a digital camera 1 including an image shake correction apparatus according to a first embodiment of the present invention. FIG. 1A is a front perspective view of the digital camera 1, and FIG. 1B is a rear perspective view of the digital camera 1. The digital camera 1 can record and reproduce not only a still image but also a moving image, an audio content, and the like.

The camera body 11 of the digital camera 1 is formed in a horizontally-long rectangular box shape as shown in FIG. 1. On the front surface of the camera body 11, an optical system 12A and a stroboscope 14, and the like, are arranged. Further, on the upper surface of the camera body 11, a shutter button 15, a power supply button 16, a mode dial 17, and the like, are arranged. On the other hand, on the rear surface of the camera body 11, a monitor 18, a zoom button 19, a cross button 20, a MENU/OK button 21, a DISP/BACK button 22, and a reproduction button 23, and the like, are arranged.

Note that on the lower surface (not shown) of the camera body 11, a tripod screw hole is provided, and also a battery insertion section and a memory card slot are provided via a cover which can be freely opened and closed. A battery and a memory card are respectively loaded in the battery insertion section and the memory card slot.

The optical system 12A is configured by a collapsible mount type zoom lens. When the mode of the camera is set to an imaging mode by the power supply button 16, a lens cover 13 is opened, and the optical system 12A is extended out from the camera body 11. Note that the zooming mechanism and the collapsing mechanism of the optical system 12A are known techniques and hence the description of their specific configuration is omitted here. Further, the details of the optical system 12A will be described in detail below.

The stroboscope 14 is configured so that the light-emitting section thereof can be horizontally and vertically moved to irradiate strobe light toward a major subject.

The shutter button 15 is configured by a so-called two-stage stroke switch which can be set at "half press" and "full press" positions. In the case where a still image is imaged (for example, in the case where the still-image imaging mode is selected by the mode dial, or where the still-image imaging mode is selected from a menu), the digital camera 1 performs imaging preparation processing, that is, each of AE (Automatic Exposure) processing, AF (Auto Focus) processing, and AWB (Automatic White Balance) processing at the time when the shutter button 15 is half-pressed, while the digital camera 1 performs imaging/recording processing of an image at the time when the shutter button 15 is full-pressed. Further, in the case where a moving image is imaged (for example, in the case where the moving-image imaging mode is selected by the mode dial, or where the moving-image imaging mode is selected from the menu), the digital camera 1 starts imaging the moving image at the time when the shutter button 15 is pressed for a long time, while the digital camera 1 ends the imaging of the moving image at the time when the shutter button 15 is again pressed for a long time. Note that it is also possible to set such that while the shutter button 15 is full-pressed, the moving image is imaged, and such that when the full-pressed state of the shutter button 15 is released, the imaging of the moving image is ended.

The power supply button 16 is a button which turns ON/OFF the power supply of the digital camera 1.

The mode dial 17 is used for switching various modes (such as an imaging mode, a reproduction mode, an erasing mode, an edit mode), and is used for setting the imaging mode, such as an auto imaging mode and a manual imaging mode.

The monitor 18 has a common aspect ratio of 4:3 and is configured by a liquid crystal display capable of performing full color display. The monitor 18 is used as an image display panel for displaying the imaged image at the time of the reproduction mode, and is also used as a user interface display panel at the time when the various setting operations are performed. Further, at the time of the imaging mode, a through image is displayed in the monitor 18 as required, so that the monitor 18 is used as an electronic finder.

The zoom button 19 is used for the zooming operation of the optical system 12A, and is configured by a zoom tele-button which instructs the zooming operation to the telescopic side, and by a zoom wide button which instructs the zooming operation to the wide-angle side.

The cross button 20, which is a button used for performing various menu settings and selections or for performing the zooming operation, is configured to be able to be press-operated in the four directions (up/down/left/right directions), and is configured such that a function corresponding to the setting state of the camera is assigned to the button of each direction. For example, at the time of imaging, the macro function ON/OFF function is assigned to the left button, and the strobe mode switching function is assigned to the right button. Further, a function to switch the lightness of the monitor 18 is assigned to the upper button, and a function to turn ON/OFF the self-timer is assigned to the lower button. Further, at the time of reproduction, the frame feeding function is assigned to the right button, and the frame returning function is assigned to the left button. Further, the function to change the lightness of the monitor 18 is assigned to the upper button, and the function to delete an image under reproduction is assigned to the lower button. Further, at the time of performing various settings, the function to move the cursor displayed in the monitor 18 in the direction of each button is assigned to the cross button 20.

The MENU/OK button 21 is used to call the menu screen (MENU function), and is used to instruct determination of selected contents and to instruct execution of processing of the selected contents. The functions assigned to the MENU/OK button 21 are switched according to the state of the settings of the digital camera 1. The menu screen is used to perform the setting of all of the adjustment items which are provided for the digital camera 1 and which include, for example, image quality adjustment items, such as an exposure value, the hue, the ISO sensitivity, and the number of recording pixels, the setting of the self-timer, the switching of the photometry system, the use or non-use of the digital zoom, and the like. The digital camera 1 is operated according to the conditions set on the menu screen.

The DISP/BACK button 22 is used to input an instruction for switching the display contents of the monitor 18, an instruction for cancelling the input operation, and the like.

The reproduction button 23 is used to instruct switching to the reproduction mode.

Next, the optical system 12A will be described in detail. The optical system 12A is configured mainly by a diaphragm, a focus lens, a zoom lens (not shown), an image pickup element 24, and an image shake correction apparatus 25.

The image pickup element 24 is a CCD type or CMOS type image sensor arranged on the lens optical axis, and electronically captures a subject image formed by the zoom lens, the focus lens, and the like.

The image shake correction apparatus 25 corrects a shake of the image formed on the image pickup element 24 by detecting a shake of the digital camera 1 with gyro sensors 71 and 74 (see FIG. 6) and by moving the image pickup element 24 in the direction opposite to the shake of the digital camera 1.

Figure 2:
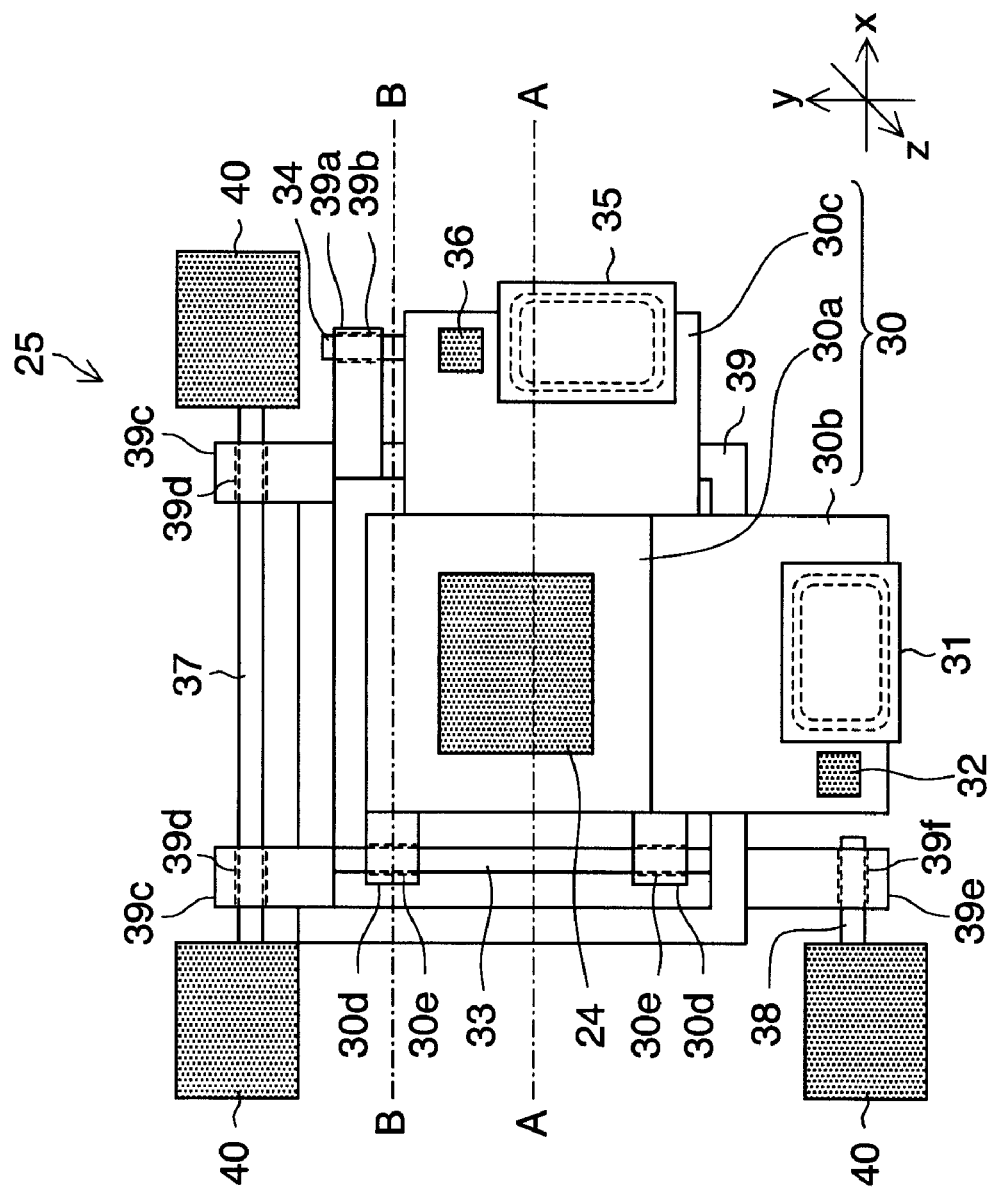
FIG. 2 is a schematic view of an image shake correction apparatus 25.

FIG. 2 is a schematic view of the image shake correction apparatus 25. As shown in FIG. 2, the image shake correction apparatus 25 is configured mainly by a moving member 30, a voice coil motor 31, a position detecting element 32, a main guide shaft 33, a rotation stop guide shaft 34, a voice coil motor 35, a position detecting element 36, a main guide shaft 37, a rotation stop guide shaft 38, a slider 39, and a fixing member 40.

The moving member 30 is a substantially L-shaped member configured by a substantially rectangular main body section 30a, a projecting section 30b formed on the lower side (−y direction) of the main body section 30a, and a projecting section 30c formed on the right side (+x direction) of the main body section 30a, and moves the image pickup element 24 in the directions (x direction and y direction in FIG. 1) perpendicular to the optical axis (z direction perpendicular to the paper surface in FIG. 1). The image pickup element 24 is provided substantially at the central portion of the main body section 30a. The voice coil motor 31 and the position detecting element 32 are provided near the tip of the projecting section 30b, while the voice coil motor 35 and the position detecting element 36 are provided near the tip of the projecting section 30c. The voice coil motors 31 and 35 are noise sources, and hence are respectively arranged at positions most apart from the image pickup element 24, that is, at positions near the tip of the projecting sections 30b and 30c.

The rotation stop guide shaft 34 is fixed to the vicinity of the tip of the projecting section 30c so as to project from the upper end surface of the projecting section 30c. The rotation stop guide shaft 34 is provided so that the voice coil motor 35 is positioned on the extension line of the rotation stop guide shaft 34. A bearing 30d is formed at each of two positions on the left side (−x direction) of the main body section 30a, and a through hole 30e is formed through the bearing 30d.

Figure 6:
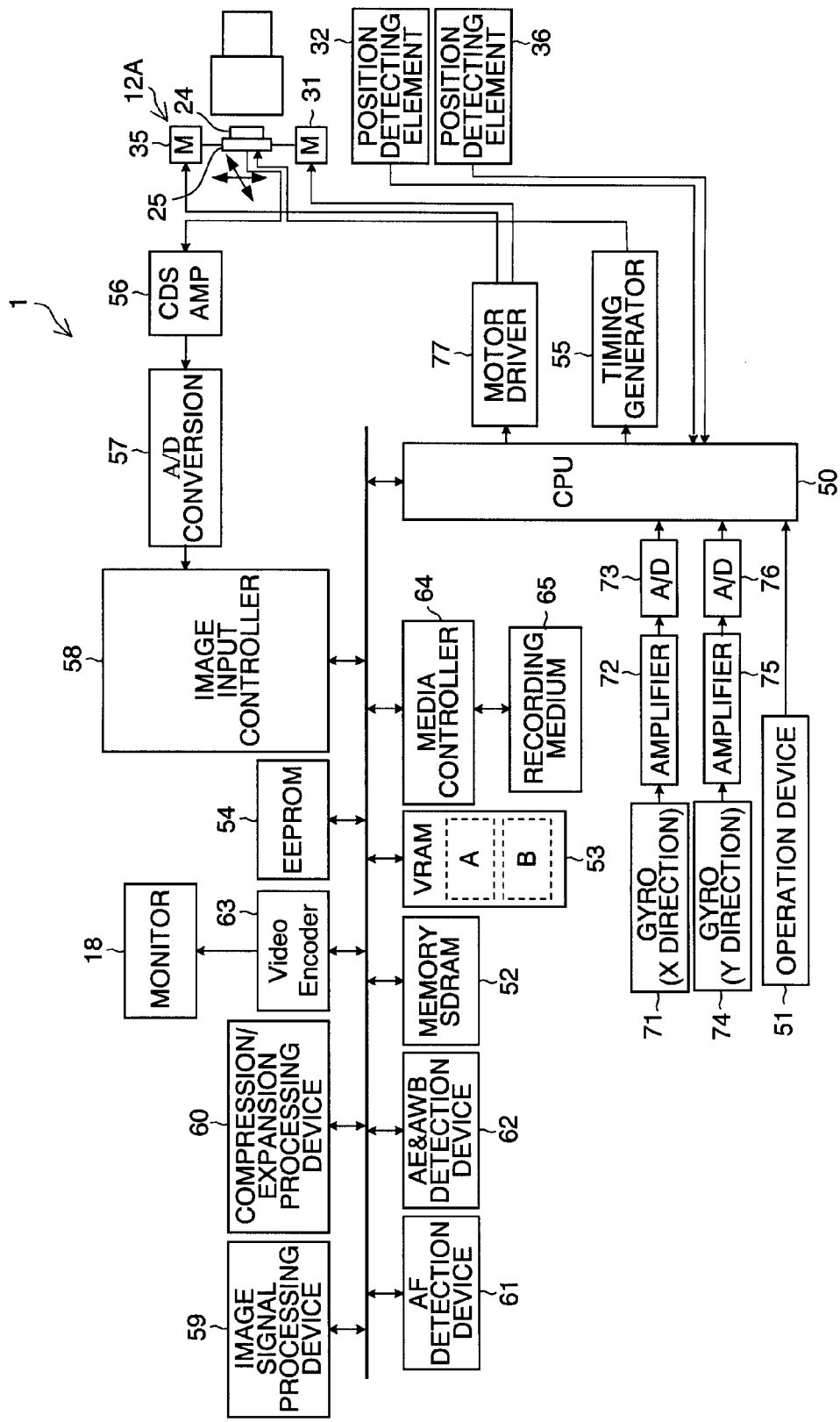
FIG. 6 is a block diagram showing an electrical configuration of the digital camera 1.

Each of the voice coil motors 31 and 35 is driven according to a signal outputted from a motor driver 77 (see FIG. 6). The voice coil motor 31 moves the moving member 30 in the y direction, while the voice coil motor 35 moves the moving member 30 and the slider 39 in the x direction. The voice coil motors 31 and 35 have a same configuration, and hence the voice coil motor 35 is described.

Figure 3:
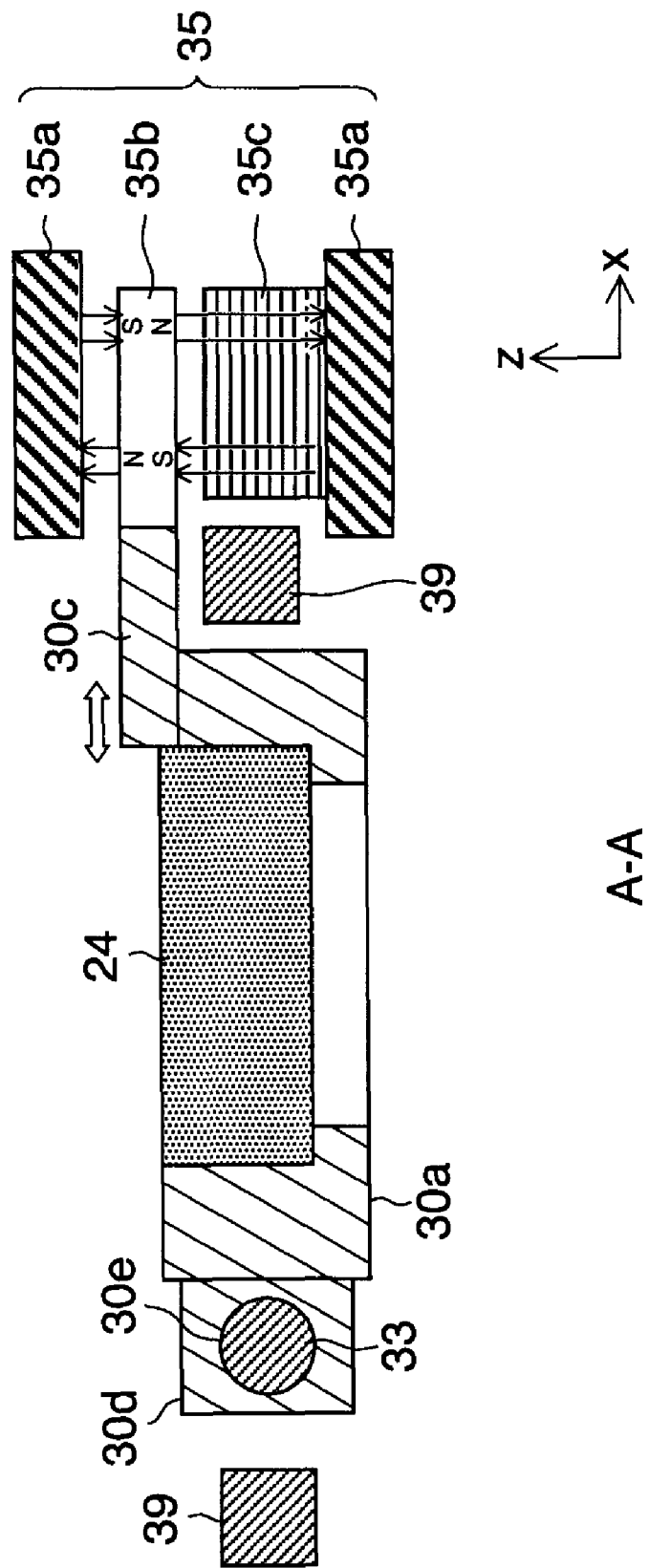
FIG. 3 is an A-A sectional view of the image shake correction apparatus 25.

FIG. 3 is a sectional view taken along line A-A in FIG. 2. The voice coil motor 35 is configured by a yoke 35a, a magnet 35b and a coil 35c.

The yokes 35a and 35a are provided to increase the magnetic field between the yokes 35 and 35a by reducing the leakage flux from the magnet 35b. One of the yokes 35a and 35a is arranged close to the magnet 35b, while the other of the yokes 35a and 35a is arranged so that the magnet 35b and the coil 35c are sandwiched by the yokes 35a and 35a.

The magnet 35b is a double-sided multi-polar magnet fixed to the end of the moving member 30, and is magnetized so that the upper left, the lower left, the upper right, and the lower right of the magnet 35b in FIG. 3 becomes the N pole, the S pole, the S pole, and the N pole, respectively. In FIG. 3, the yoke 35a is arranged close to the bottom of the coil 35c. A magnetic field directed upward (+z direction) is generated on the left side of the magnet 35b, while a magnetic field directed downward (−z direction) is generated on the right side of the magnet 35b (see the arrows in FIG. 3). Further, in FIG. 3, the yoke 35a is arranged close to the top of the magnet 35b. Thereby, the magnetic filed of the magnet 35b on the side of the coil 35c can be increased.

The coil 35c is a cylindrical air-core coil having a substantially rectangular cross section, and is formed by being wound in the counter clockwise winding direction (seen from the z direction) so as to be stacked in the optical axis direction (z direction). Although not shown in FIG. 4, the coil 35c is fixed to the moving member 30.

The coil 35c is arranged in the magnetic field generated by the magnet 35b. Therefore, when a current is made to flow through the coil 35c, a force is generated in the direction perpendicular to both the magnetic field and the current according to Fleming's left-hand rule. Since the coil 35c is fixed to the moving member 30, the force moves the magnet 35b in the direction perpendicular to both the magnetic field and the current, that is, in the x direction. According to the movement of the magnet 35b, the moving member 30 is also moved in the x direction. Therefore, the image pickup element 24 can be moved in the x direction by the voice coil motor 35. Similarly, the image pickup element 24 can be moved in the y direction by the voice coil motor 31.

The position detecting elements 32 and 36 are, for example, Hall elements and detect the position of the moving member 30. The position detecting element 32 detects a position in the y direction, while the position detecting element 36 detects a position in the x direction. The position detecting element 32 performs position detection each time the slider 39 is moved in the y direction, while the position detecting element 36 performs position detection each time the slider 39 is moved in the x direction.

Figure 4:
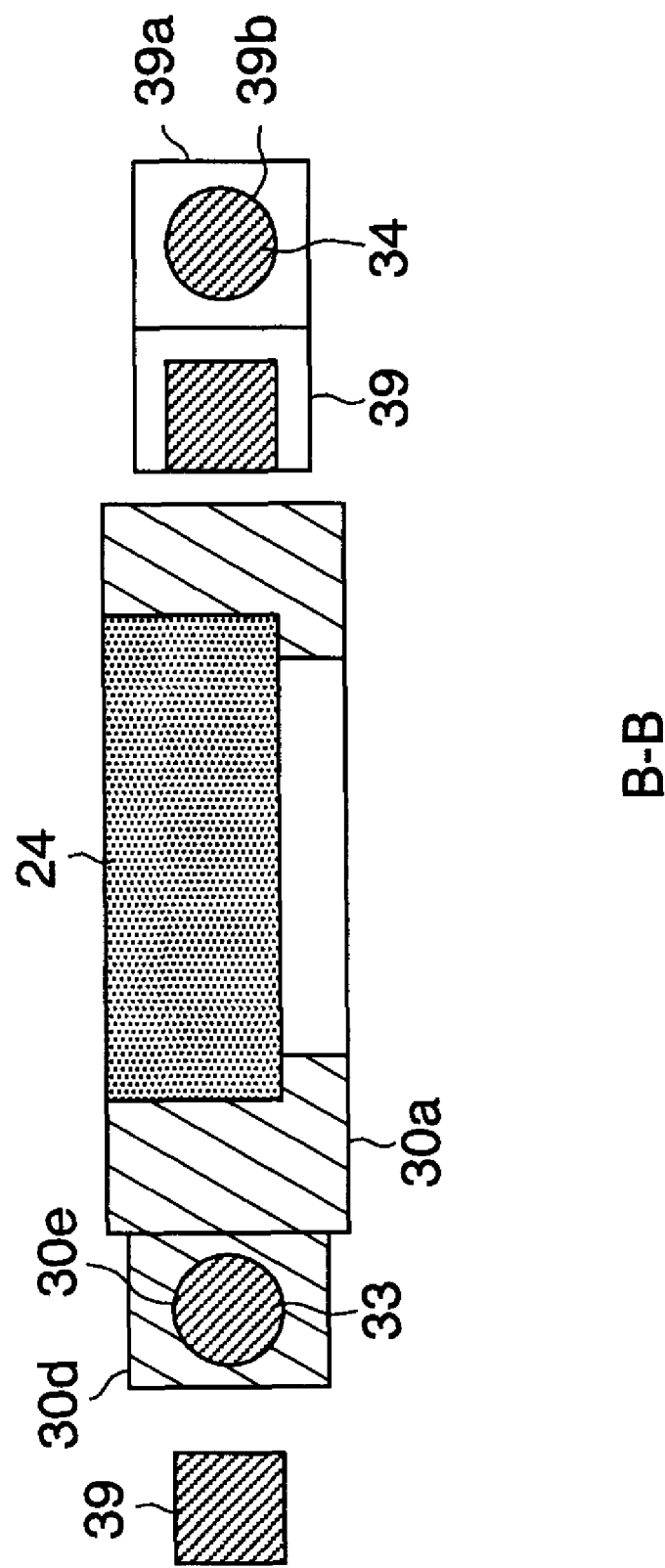
FIG. 4 is a B-B sectional view of the image shake correction apparatus 25.

The main guide shaft 33, which is a shaft for moving the moving member 30 in the y direction, is inserted, as shown in FIG. 4, into the through hole 30e formed through the bearing 30d, and is fixed to the slider 39. When the bearing 30d is moved along the main guide shaft 33, the moving member 30 is moved in the y direction.

The rotation stop guide shaft 34 prevents the moving member 30 from being rotated about the central axis of the main guide shaft 33 and the through hole 30e, and is inserted into a through hole 39b so as to be fixed to the moving member 30. The rotation stop guide shaft 34 is moved inside the through hole 39b in the y direction as the moving member 30 is moved along the main guide shaft 33. The main guide shaft 33 and the rotation stop guide shaft 34 are respectively arranged on both sides of the image pickup element 24 and in parallel with each other.

Figure 5:
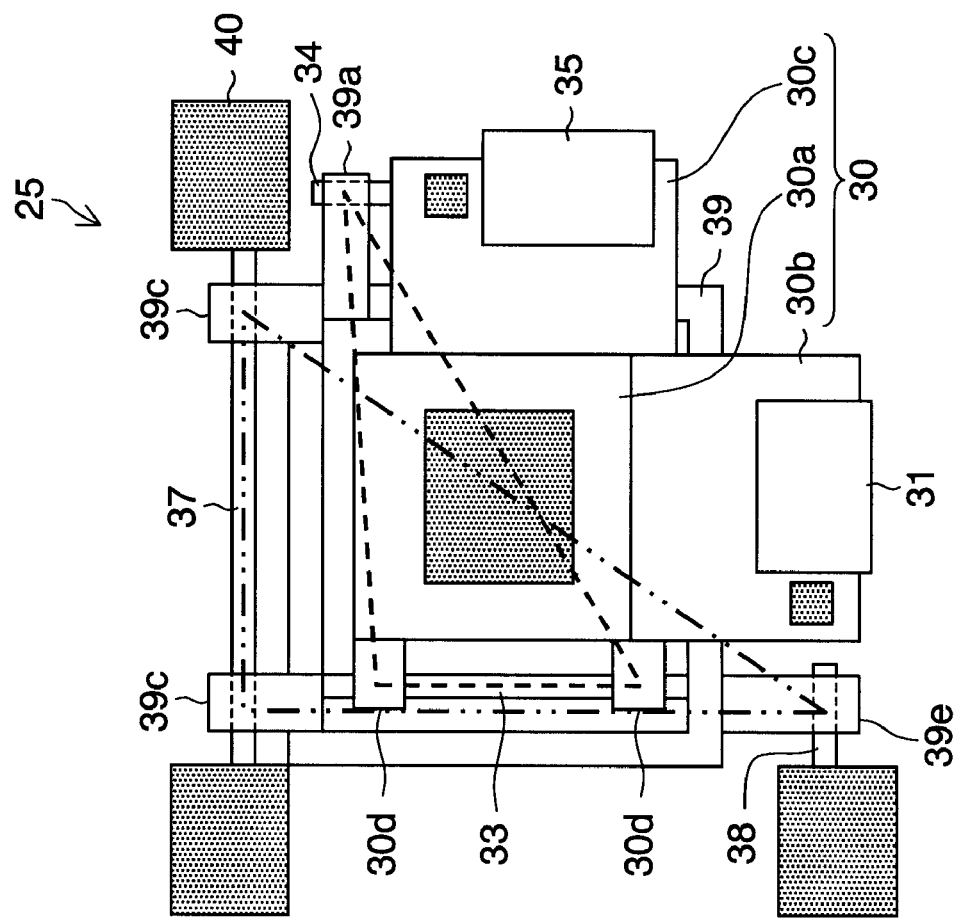
FIG. 5 is a schematic view of the image shake correction apparatus 25.

As shown by the dotted lines in FIG. 5, the moving member 30 is supported by the triangle formed by connecting the two through holes 30e and the through hole 39b with each other. The gap between the main guide shaft 33 and the through hole 30e and the gap between the rotation stop guide shaft 34 and the through hole 39b are in a range of about 0.1 microns. Thus, the inclination of the moving member 30 in the optical axis direction (z direction) is more reduced as the triangle formed by connecting the two through holes 30e and the through hole 39b with each other is made larger. In the present embodiment, the rotation stop guide shaft 34 is arranged at the tip of the right side projecting section of the moving member 30. That is, the rotation stop guide shaft 34 is arranged so that the voice coil motor 35 is positioned on the extension line of the rotation stop guide shaft 34. Thus, the triangle can be enlarged as compared with the prior art form (see FIG. 17) in which the rotation stop guide shaft is arranged between the voice coil motor and the image pickup element. Therefore, the inclination of the moving member 30 can be reduced, so that it is possible to stably hold and move the moving member 30, that is, to stabilize the system. Note that in order to increase the size of the triangle, it is preferred that the distance between the two bearings 30d is increased as much as possible.

Further, since the voice coil motor 35 is arranged on the extension line of the rotation stop guide shaft 34, it is possible to reduce the size of the moving member 30, that is, the size of the image shake correction apparatus 25 by the amount corresponding to the rotation stop guide shaft, as compared with the prior art form (see FIG. 17) in which the voice coil motor 35 and the rotation stop guide shaft 34 are arranged side by side in the x direction.

The slider 39 is a substantially square-shaped member, and moves the image pickup element 24 in the x direction together with the moving member 30. Near the right side (+x side) upper end (+y side) of the slider 39, the bearing 39a is formed, and a through hole 39b is formed through the bearing 39a. Near the upper side (+y direction) both ends of the slider 39, two bearings 39c are formed, and a through hole 39d is formed through each of the bearings 39c. Near the lower side (−y direction) left end (−x direction) of the slider 39, a bearing 39e is formed, and a through hole 39f is formed through the bearing 39e. When the slider 39 is formed into the substantially square shape, it is possible to maintain the mechanical strength of the slider 39.

The main guide shaft 37, which is a shaft for moving the slider 39 in the x direction, is inserted into the through holes 39d respectively formed through the bearings 39c, and is fixed to the fixing member 40. When the through hole 39d is moved along the main guide shaft 37, the slider 39 is moved in the x direction.

The rotation stop guide shaft 38, which prevents the slider 39 from being rotated about the central axis of the main guide shaft 37 and the through hole 39d, is inserted into the through hole 39f formed through the bearing 39e, and is fixed to the fixing member 40. The main guide shaft 37 and the rotation stop guide shaft 38 are respectively arranged on both sides of the image pickup element 24 and in parallel to each other.

As shown by the two-dot chain lines in FIG. 5, the slider 39 is supported by the triangle formed by connecting the through holes 39d and through hole 39f with each other. The gap between the main guide shaft 37 and the through hole 30d and the gap between the rotation stop guide shaft 38 and the through hole 39f are in a range of about 0.1 microns. Thus, the inclination of the slider 39 in the optical axis direction (z direction) is more reduced as the triangle formed by connecting the through holes 30d and the through hole 39f with each other is made larger. In the present embodiment, the bearings 39c and the bearing 39e are formed in the vicinity of the three corner sections of the substantially square-shaped slider 39, and also the rotation stop guide shaft 38 is arranged so that the voice coil motor 31 is positioned on the extension line of the rotation stop guide motor 38. Thus, the triangle can be made larger as compared with the prior art form (see FIG. 17) in which the rotation stop guide shaft 38 is arranged on the inner side of the voice coil motor. Thereby, the inclination of the slider 39 can be reduced, so that the slider 39 can be stably held and moved, that is, the system can be stabilized. At the same time, the size of the slider, that is, the size of the image shake correction apparatus 25 can be reduced by the amount corresponding to the rotation stop guide shaft.

Further, since the voice coil motors 35 and 31 are respectively arranged on the extension lines of the rotation stop guide shafts 34 and 38, the force is equally applied to the main guide shafts 33 and 37 and the rotation stop guide shafts 34 and 38 as compared with the case where the voice coil motors 31 and 35 are arranged on the outer side of the rotation stop guide shaft. Thus, the moving member 30 and the slider 39 can be stably held and moved.

In the case where the position detecting elements 32 and 36 detect a position, when the z-direction position of the position is changed, the position detecting elements 32 and 36 may erroneously detect that the x- and y-direction positions of the position are changed. However, when the triangle formed by connecting the three points, by which each of the moving member 30 and the slider 39 is positioned, is made large so as to reduce the inclination of the moving member 30 and the slider 39, the erroneous determination by the position detecting elements 32 and 36 can be reduced, and thereby the accuracy can be improved.

Further, the size of the image shake correction apparatus 25 is reduced, and at the same time, the weight of the image shake correction apparatus 25 is reduced. Thus, the thrust force required for the driving can be reduced. Thereby, the size of the magnet 35b and the coil 35c can be reduced, and the magnetic field strength can be reduced. Therefore, even when the distance between the voice coil motors 31 and 35, and the image pickup element 24 is reduced to bring the image pickup element 24 and the magnet 35b close to each other, the influence of the noise due to the magnetic force is reduced to be small.

The fixing member 40 is a member which fixes the main guide shaft 37 and the rotation stop guide shaft 38 to the inside of the camera body 11.

Next, the electrical configuration of the digital camera 1 is described. As shown in FIG. 6, the digital camera 1 is configured mainly by a CPU 50, operation devices (the shutter button 15, the power supply button 16, the mode dial 17, the zoom button 19, the cross button 20, the MENU/OK button 21, the DISP/BACK button 22, the reproduction button 23, and the like) 51, an SDRAM 52, a VRAM 53, an EEPROM 54, a timing generator (TG) 55, an analog signal processing device 56, an A/D converter 57, an image input controller 58, an image signal processing device 59, a compression/expansion processing device 60, an AF detection device 61, an AE/AWB detection device 62, a video encoder 63, a media controller 64, the gyro sensors 71 and 74, amplifiers 72 and 75, A/D converters 73 and 76, the motor driver 77.

The CPU 50 functions as a control device to generally control the entire operation of the digital camera 1. The CPU 50 also functions as an arithmetic operation device for performing various kinds of arithmetic processing, and controls each of the sections of the digital camera 1 on the basis of an input from the operation device 51, or the like, and according to a predetermined control program.

The SDRAM 52 is used as a work area of the CPU 50.

The VRAM 53 is used as a temporary storage area of image data, and the like.

The EEPROM 54 is a nonvolatile memory and stores various control programs, setting information, and the like. The main CPU 50 performs various kinds of processing on the basis of the programs and the setting information.

The TG 55 controls the image pickup element 24 and photo charge accumulation and transfer operations of the image pickup element 24. Further, the electronic shutter speed (photo charge accumulation time) is determined by the timing signal (clock pulse) inputted from the TG 55. At the time of the imaging mode, the image pickup element 24 acquires image signals for one screen for every predetermined period. The image pickup signals outputted from the image pickup element 24 are inputted into the analog signal processing device 56, respectively.

The analog signal processing device 56 performs correlated double sampling processing (that is performed to obtain precise pixel data by taking difference between the levels of the feed-through component and the pixel signal component which are included in the output signal of each pixel of the image pickup element, and that is performed to reduce the noises (particularly thermal noise), and the like, which are included in the output signal of the image pickup element) to each of the image signals outputted from the image pickup element 24, so as to amplify and output the processed image signals.

The A/D converter 57 converts the inputted analog image data into digital image data. The image pickup signals outputted from the image pickup element 24 of the optical system 12A is outputted as digital image data.

The image input controller 58, in which a line buffer having a predetermined capacity is incorporated, accumulates, according to a command from the CPU 50, the image signals for one image which are outputted from the A/D converter 57, and makes the accumulated image signals recorded in the VRAM 53.

The image signal processing device 59 includes a synchronization circuit (processing circuit which simultaneously converts color signals by interpolating the spatial deviation of the color signals due to the color filter arrangement of the single plate CCD), a white balance correction circuit, a gamma correction circuit, a contour correction circuit, a luminance and color difference signal generation circuit, and the like. According to a command from the CPU 50, the image signal processing device 59 performs required signal processing to the right and left eye image data inputted from the A/D converter 57, so as to generate image data (YUV data) made of luminance data (Y data) and color difference data (Cr, Cb data), and outputs the generated image data to the video encoder 63 for display. When the monitor 18 is used as an electronic viewfinder at the time of the imaging mode, the generated image data are displayed as a live view image (through image) in the monitor 18 via the video encoder 63. Further, the image signal processing device 59 converts the YC signals of the right and left eye image data captured by the image pickup element 24 into video signals of a predetermined system (for example, color composite video signals of the NTSC system), and composes the converted video signals into three-dimensional image data used for performing a three-dimensional display in an external three-dimensional image display apparatus, and the like.

According to a command from the CPU 50, the compression/expansion processing device 60 applies compression processing of a predetermined system to the inputted image data, so as to generate compressed image data. Further, the compression/expansion processing device 60 subjects the right and left eye image data stored in the VRAM 53 to compression processing based on a predetermined compression format, such as JPEG system for still image, and MPEG 2, MPEG4, or H.264 system for moving image. The compression/expansion processing device 60 converts the two-dimensional still image data into an image file of a predetermined format, such as an Exif file, and stores the image file in a recording medium 65. The Exif file has a region for storing main image data and a region for storing a minified image (thumbnail image). From the main image data acquired by the imaging operation, a thumbnail image of a predetermined size (such as, for example, 160×120 pixels or 80×60 pixels) is generated through the pixel thinning processing and the other necessary data processing. The thumbnail image generated in this way is written in the Exif file together with the main image. Further, tag information including an imaging date, imaging conditions, face detection information, and the like, is attached to the Exif file.

When a release switch is half-pressed in the imaging standby state, the AE/AWB detection device 62 calculates, according to a command from the CPU 50, physical quantities necessary for the AE control and the AWB control from the inputted image signals. For example, the AE/AWB detection device 62 calculates, as a physical quantity necessary for the AE control, an integrated value of R, G, and B image signals in each divided area obtained by dividing one screen into a plurality of areas (for example, 16×16). The CPU 50 detects the lightness of the subject (subject luminance) on the basis of the integrated value obtained from the AE/AWB detection device 62, and calculates an exposure value (imaging EV value) suitable for imaging. Then, the CPU 50 determines an exposure value and a shutter speed from the calculated imaging EV value and a predetermined program diagram.

Further, the AE/AWB detection device 62 calculates, as a physical quantity necessary for the AWB control, an average integrated value for each of R, G, and B color image signals in each divided area obtained by dividing one screen into the plurality of areas (for example, 16×16). The CPU 50 calculates the ratios of R/G and B/G for each divided area from the obtained integrated values of R, B and G, and determines the kind of light source on the basis of the distribution, and the like, of the obtained values of R/G and R/G in the color space of R/G and B/G axis coordinates. Then, according to white balance adjustment values suitable for the determined kind of light source, the CPU 50 determines, for the R, G and B signals, gain values (white balance adjustment values) of the white balance adjustment circuit so that each value of the ratios of R/G and R/G becomes about 1 (that is, the integration ratio of RGB in one screen is set as R:G:B≈1:1:1).

When the release switch is half-pressed in the imaging standby state, the AF detection device 61 calculates, according to a command from the CPU 50, a physical quantity necessary for the AF control from the inputted image signal. In the digital camera 1 according to the present embodiment, the AF control (so-called contrast AF) is performed on the basis of the contrast of the image obtained from the image pickup element 24, and the AF detection device 61 calculates, from the inputted image signal, a focus evaluation value indicating the sharpness of the image. The CPU 50 detects a position at which the focus evaluation value calculated by the AF detection device 61 becomes a local maximum, and moves the focus lens group to the position. That is, the CPU 50 moves the focus lens group in predetermined steps from a close-range position to an infinity position, to acquire the focus evaluation value at each position. The CPU 50 sets, as the focusing position, the position at which the acquired focus evaluation value is maximum. Then, the CPU 50 moves the focus lens group to the position.

The video encoder 63 outputs, to the monitor 18, the RGB signals outputted from the image signal processing device 59.

The media controller 64 records each of the image data, which are subjected to the compression processing by the compression/expansion processing device 60, in the recording medium 65 connected via the media controller 64 or in the other recording medium.

Various recording media including a semiconductor memory card, which is detachably attached to the digital camera 1 and which is represented by an xD picture card (registered trademark) and a Smart Media (registered trademark), a portable type small hard disk, a magnetic disk, an optical disk, a magneto-optical disk, and the like, can be used as the recording medium 65.

A power supply battery is detachably provided in the digital camera 1. The power supply battery is configured by a rechargeable secondary battery, such as for example, a nickel-cadmium battery, a nickel-hydride battery, and a lithium ion battery. The power supply battery may also be configured by a disposable primary battery, such as for example, a lithium battery, and an alkaline battery. The power supply battery is electrically connected to each of the devices of the digital camera 1 by being loaded in a battery housing (not shown).

The gyro sensors 71 and 74 are sensors for detecting the angular velocity of the digital camera 1, and detect vibration of the digital camera 1 due to a camera shake. The gyro sensor 71 detects the acceleration in the x direction (see FIG. 2), while the gyro sensor 74 detects the acceleration in the y direction (see FIG. 2).

The amplifiers 72 and 75 respectively amplify the signals detected by the gyro sensors 71 and 74, and respectively output the amplified signals to the A/D converters 73 and 76.

The A/D converters 73 and 76 respectively convert the signals amplified by the amplifiers 72 and 75 into digital signals, and respectively input the converted signals into the CPU 50. The CPU 50 amplifies the signals inputted from the gyro sensors 71 and 74, to output the amplified signals to the motor driver 77.

The motor driver 77 drives the voice coil motors 31 and 35 on the basis of the signals inputted from the CPU 50.

Each of the imaging, recording, reproducing, and editing operations of the digital camera 1 configured as described above will be described. The processing as will be described below is performed mainly by the CPU 50.

When the power supply button is pressed to turn on the power supply of the digital camera 1, the digital camera 1 is started in the imaging mode, so that the CPU 50 starts a through-image imaging operation by using the image pickup element 24. That is, an image is continuously captured by the image pickup element 24, and the obtained image signal is continuously processed so that through image data are generated. The generated image data are successively added to the video encoder 63, and are converted into a display signal format, so as to be outputted to the monitor 18, respectively.

Subsequent to the start of the through-image imaging operation, the CPU 50 corrects an image shake which is caused in the subject image captured by the image pickup element 24, due to vibration (camera shake, and the like) applied to the digital camera 1.

When vibrations in the x direction and the y direction are detected by the gyro sensors 71 and 74, the detected signals are inputted into the CPU 50 via the amplifiers 72 and 75 and the A/D converters 73 and 76. The CPU 50 drives the voice coil motor 35 via the motor driver 77 on the basis of the signal inputted from the gyro sensor 71. Further, the CPU 50 drives the voice coil motor 31 via the motor driver 77 on the basis of the signal inputted from the gyro sensor 74. When the voice coil motors 31 and 35 are driven, the position detecting elements 32 and 36 respectively detect the positions in the y direction and the x direction, and output the detected results to the CPU 50. The CPU 50 controls the voice coil motors 31 and 35 so that the positions inputted from the position detecting elements 32 and 36 become target positions. Thereby, a suitable anti-vibration operation can be performed.

The CPU 50 determines whether or not the shutter button 15 is half-pressed, that is, whether or not an S1ON signal is inputted into the CPU 50. When the S1ON signal is inputted, the CPU 50 performs, in response to the S1ON signal, the imaging preparation processing, that is, each of the AE processing, the AF processing, and the AWB processing.

First, the image signal taken from the image pickup element 24 is inputted into the AF detection device 61 and the AE/AWB detection device 62.

The data of the integrated value obtained by the AF detection device 61 is notified to the CPU 50.

While moving the focus lens group of the optical system 12A, the CPU 50 calculates a focus evaluation value (AF evaluation value) at each of a plurality of AF detection points, and determines, as a focusing position, the lens position at which the evaluation value becomes a local maximum. Then, the CPU 50 moves the focus lens group to the obtained focusing position.

The CPU 50 detects the lightness of the subject (subject luminance) on the basis of the integrated value obtained from the AE/AWB detection device 62, to calculate an exposure value (imaging EV value) suitable for imaging. The CPU 50 determines a diaphragm value and a shutter speed from the obtained imaging EV value and a predetermined program diagram. According to the shutter speed and the diaphragm value, the CPU 50 obtains a proper exposure light quantity by controlling the electronic shutter and the diaphragm for the image pickup element 24. At the same time, the CPU 50 determines, on the basis of the detected subject luminance, whether or not the light emission of the stroboscope 14 is necessary.

Further, the AE/AWB detection device 62 calculates the average integrated value of each of the R, G, and B color signals in each divided area at the time of the automatic white balance adjustment, and supplies the calculated results to the CPU 50. The CPU 50 obtains the ratios of R/G and B/G for each divided area from the obtained integrated values of R, G and B, and determines the kind of light source on the basis of the distribution, and the like, of the obtained values of R/G and R/G in the color space of R/G and B/G axis coordinates. Then, according to white balance adjustment values suitable for the determined kind of light source, the CPU 50 corrects each of the color channel signals by controlling, for the R, G, B signals, the gain values (white balance correction values) of the white balance adjustment circuit so that, for example, the value of each of the ratios of R/G and R/G becomes about 1 (that is, the integration ratio of RGB in one screen is set as R:G:B≈1:1:1).

As described above, the AE/AF processing is performed at the time when the shutter button 15 is half-pressed. Note that the user zooms the lens and adjusts the field angle, as required, by operating the zoom button 19.

The CPU 50 determines whether or not the shutter button 15 is full-pressed, that is, an S2ON signal is inputted into the CPU 50. When the S2ON signal is inputted, the CPU 50 performs, in response to the S2ON signal, the imaging processing and the recording processing as will be described below.

First, the CPU 50 captures an image for recording by exposing the image pickup element 24 at the diaphragm value and the shutter speed which are obtained by the above described AE processing.

The image signals outputted from the image pickup element 24 are taken via the analog signal processing device 56, the A/D converter 57, and the image input controller 58, so as to be stored in the VRAM 53. The image signals stored in the VRAM 53 are inputted into the image signal processing device 59 under control of the CPU 50. The image signal processing device 59 applies predetermined signal processing to the inputted image signals, to generate image data (YUV data) made of luminance data and color difference data.

The image data generated by the image signal processing device 59 are once stored in the VRAM 53, and are then inputted into the media controller 64. The media controller 64 applies predetermined compression processing to the inputted image data, to generate compressed image data.

The compressed image data are stored in the VRAM 53, and are recorded as a still image file of a predetermined format (for example, Exif file) in the recording medium 65 via the media controller 64.

When the reproduction button 23 is pressed, the CPU 50 switches the digital camera 1 to the reproduction mode. The CPU 50 reads the compressed image data of the finally recorded image file. When the finally recorded image file is recorded in the recording medium 65, the CPU 50 reads the compressed image data of the image file finally recorded in the recording medium 65 via the media controller 64.

The compressed image data read from the recording medium 65 are added to the compression/expansion processing device 60, so as to be converted into non-compressed image data, and are then inputted into the VRAM 53. Then, the non-compressed image data are outputted from the VRAM 53 to the monitor 18 via the video encoder 63. Thereby, the image recorded in the recording medium 65 is reproduced and displayed in the monitor 18.

The image frame feeding is performed by the key operation of the right and left buttons of the cross button 20. When the right key is operated, the next image file is read from the recording medium 65, so as to be reproduced and displayed in the monitor 18. Further, when the left key of the cross button 20 is operated, the image file just before the currently displayed image file is read from the recording medium 65, so as to be reproduced and displayed in the monitor 18.

According to the present embodiment, since the voice coil motor is arranged on the extension line of the rotation stop guide shaft, the image shake correction apparatus can be reduced in size as compared with the prior art form in which the rotation stop guide shaft and the bearing are arranged on the inner side of the slider.

Further, according to the present embodiment, the main guide shaft, the rotation stop guide shaft, and the three bearings are arranged so as to enlarge the triangle formed by connecting, with each other, the three points (three bearings) which support each of the moving member and the slider. Thereby, the inclination of the moving member and the slider can be reduced, and the system can be stabilized. As a result, the moving member and the slider can be stably moved, so that the anti-vibration performance can be improved.

Further, according to the present embodiment, the image shake correction apparatus can be reduced in size and thereby can be reduced in weight. Thus, the thrust force required for the movement and the frictional force at the time of the movement can be reduced, so that the energy efficiency of the image shake correction apparatus can be improved.

Note that in the present embodiment, as shown in FIG. 3, the slider 39 and the voice coil motors 31 and 35 are arranged side by side in the x direction or in the y direction, but it may also be configured such that the slider 39 overlaps with the voice coil motor 31 and the voice coil motor 35 in the optical direction (z direction). However, the thickness in the optical axis direction is increased in this case. Thus, it is preferred that as shown in FIG. 3, the slider 39 and the voice coil motors 31 and 35 are arranged side by side in the x direction or in the y direction.

<Second Embodiment>

In the first embodiment according to the present invention, the image shake correction apparatus is reduced in size in such a manner that the substantially square-shaped slider is used, and that the voice coil motor is arranged on the extension line of the rotation stop guide shaft. However, the form which can reduce the size of the image shake correction apparatus is not limited to this.

A second embodiment is a form in which the size of the image shake correction apparatus is reduced in such a manner that a substantially L-shaped slider is used, and that the voice coil motor is arranged on the extension line of the rotation stop guide shaft. In the following, a digital camera 2 according to the second embodiment will be described. Note that components which are the same as those of the first embodiment are designated by the same reference numerals and characters, and the description thereof is omitted. Further, the effect of the digital camera 2 is the same as the effect of the digital camera 1, the description of the effect is omitted.

The camera body 11 of the digital camera 2 is formed in a horizontally-long rectangular box shape. On the front surface of the camera body 11, an optical system 12B and the stroboscope 14, and the like, are arranged. Further, the shutter button 15, the power supply button 16, the mode dial 17, and the like, are arranged on the upper surface of the camera body 11. On the other hand, the monitor 18, the zoom button 19, the cross button 20, the MENU/OK button 21, the DISP/BACK button 22, and the reproduction button 23, and the like, are arranged on the rear surface of the camera body 11.

The details of the optical system 12B will be described in detail. The optical system 12B is configured mainly by a diaphragm, a focus lens group, a zoom lens group (not shown), the image pickup element 24, and an image shake correction apparatus 27.

Figure 7:
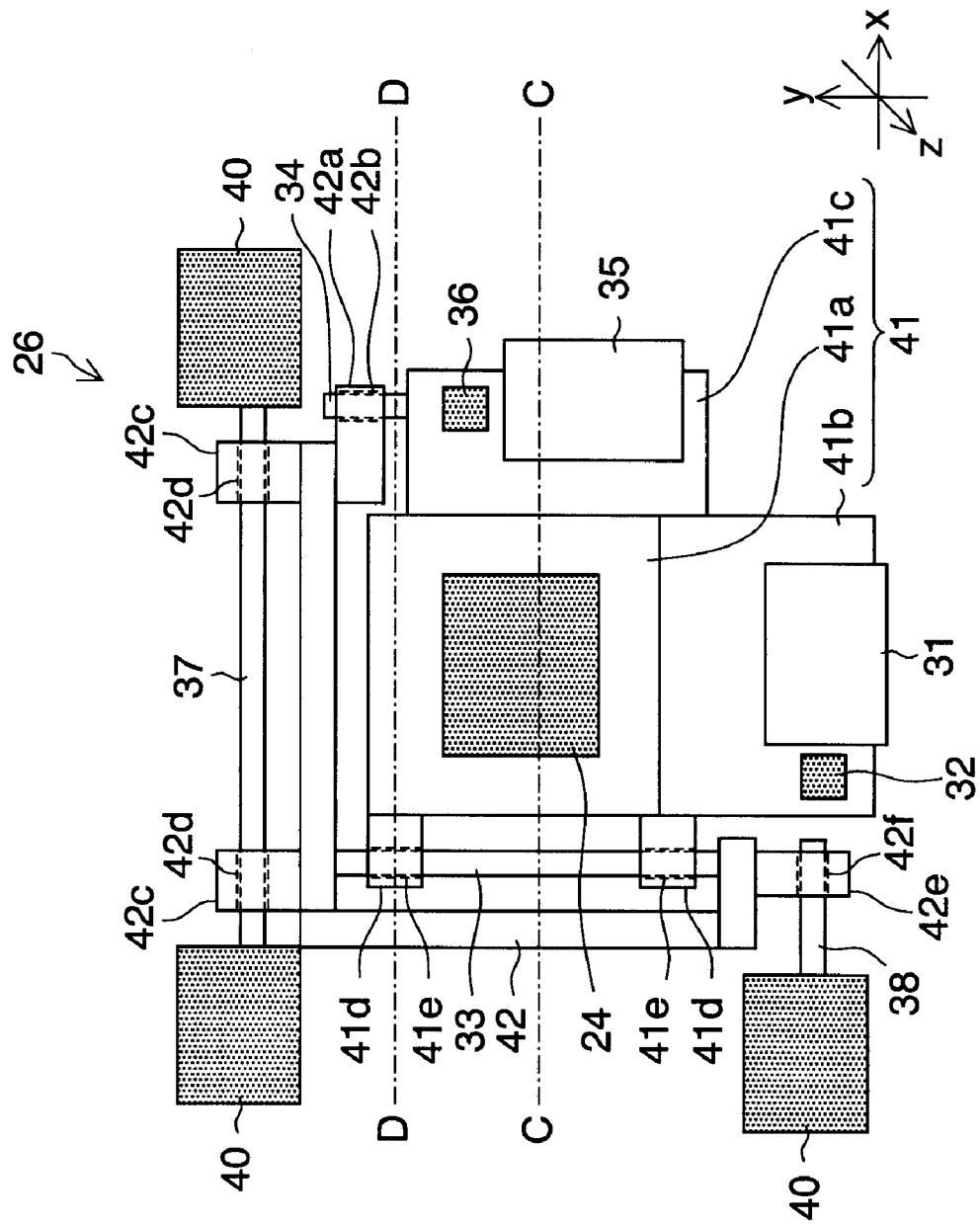
FIG. 7 is a schematic view of an image shake correction apparatus 26 of a digital camera 2 according to a second embodiment of the present invention.

FIG. 7 is a schematic view of the image shake correction apparatus 26. As shown in FIG. 7, the image shake correction apparatus 26 is configured mainly by a moving member 41, the voice coil motor 31, the position detecting element 32, the main guide shaft 33, the rotation stop guide shaft 34, the voice coil motor 35, the position detecting element 36, the main guide shaft 37, the rotation stop guide shaft 38, a slider 42, and the fixing member 40.

The moving member 41 is a substantially L-shaped member configured by a substantially rectangular main body section 41a, a projecting section 41b formed at the lower side (−y direction) of the main body section 41a, and a projecting section 41c formed at the right side (+x direction) of the main body section 41a, and moves the image pickup element 24 in the direction (x direction and y direction in FIG. 7) perpendicular to the optical axis (z direction perpendicular to the paper surface in FIG. 7). The image pickup element 24 is provided substantially at the central portion of the main body section 41a. The voice coil motor 31 and the position detecting element 32 are provided near the tip of the projecting section 41b. The voice coil motor 35 and the position detecting element 36 are provided near the tip of the projecting section 41c. The voice coil motors 31 and 35 are noise sources, and hence are respectively arranged at the positions most apart from the image pickup element 24, that is, near the tip of the projecting sections 41b and 41c.

The rotation stop guide shaft 34 is fixed to the vicinity of the tip of the projecting section 41c so as to project from the upper end surface of the projecting section 41c. The rotation stop guide shaft 34 is provided so that the voice coil motor 35 is positioned on the extension line of the rotation stop guide shaft 34. A bearing 41d is formed at each of two positions on the left side (−x direction) of the moving member 41, and a through hole 41e is formed through the bearing 41d.

Figure 8:
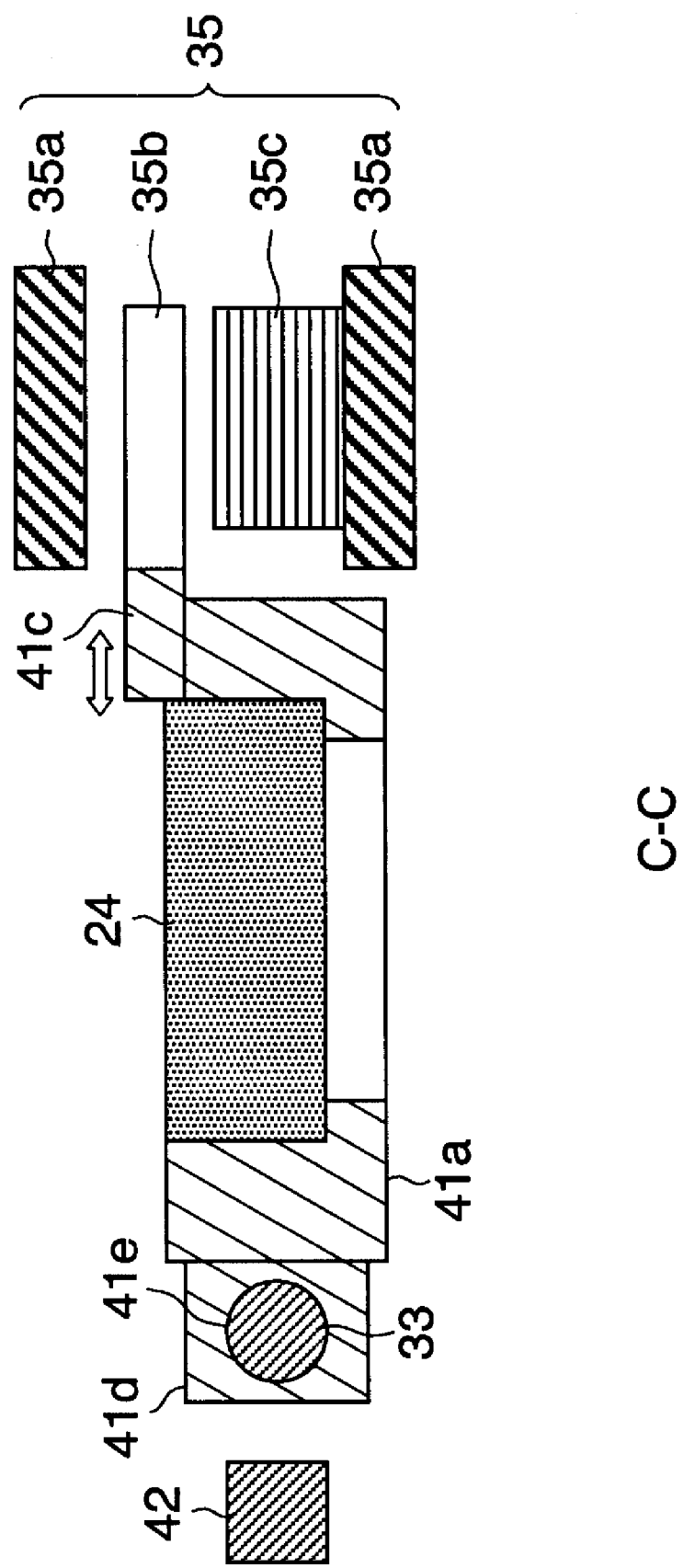
FIG. 8 is a C-C sectional view of the image shake correction apparatus 26.
Figure 9:
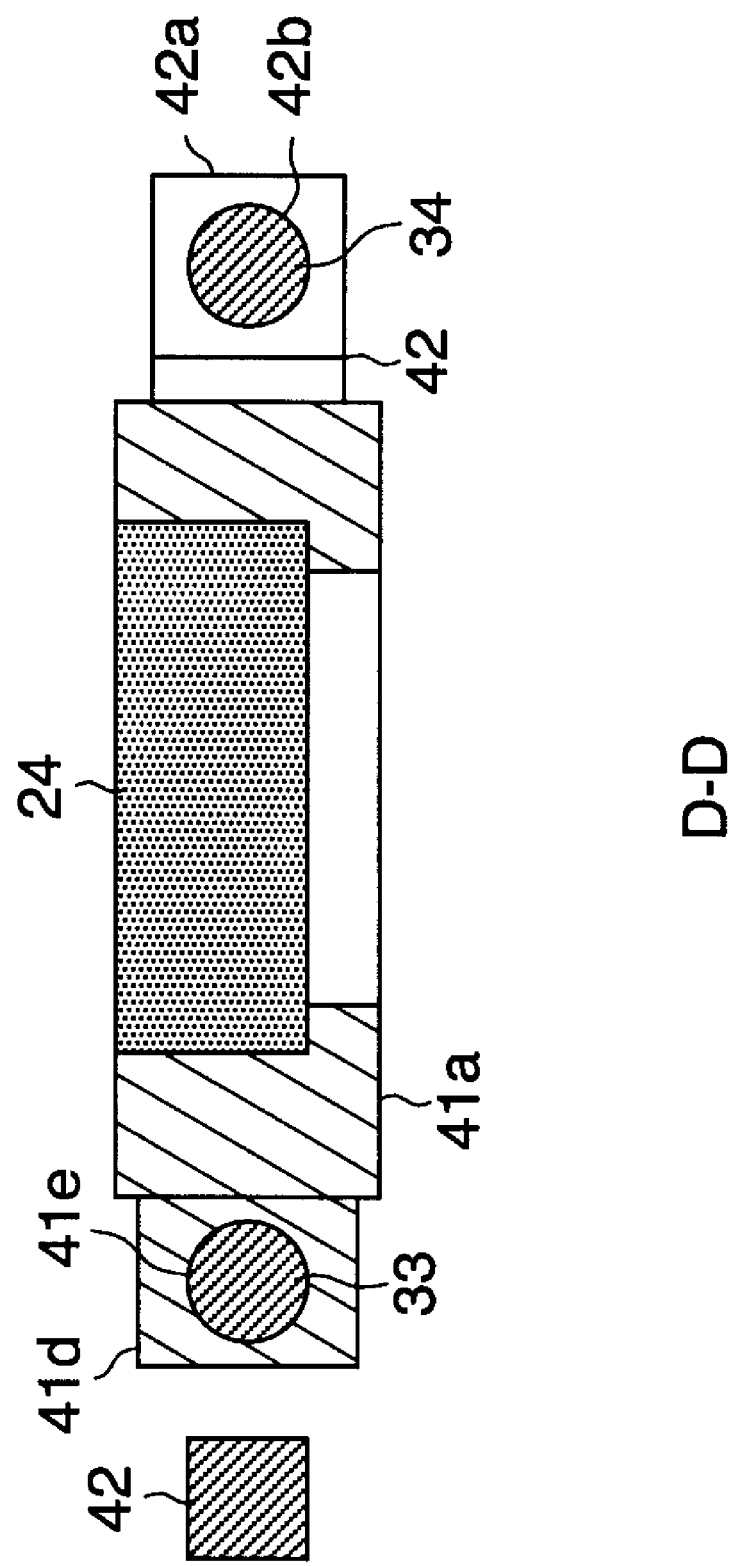
FIG. 9 is a D-D sectional view of the image shake correction apparatus 26.

The main guide shaft 33 is a shaft for moving the moving member 41 in the y direction. As shown in FIG. 8 and FIG. 9, the main guide shaft 33 is inserted into the through holes 41e respectively formed through the bearings 41d, and is fixed to the slider 42. When the bearing 41d is moved along the main guide shaft 33, the moving member 41 is moved in the y direction.

The rotation stop guide shaft 34 prevents the moving member 41 from being rotated about the central axis of the main guide shaft 33 and the through hole 41e, and is inserted into a through hole 42b, so as to be fixed to the moving member 41. The rotation stop guide shaft 34 is moved inside the through hole 42b in the y direction as the moving member 41 is moved along the main guide shaft 33 in the y direction. The main guide shaft 33 and the rotation stop guide shaft 34 are respectively arranged on both sides of the image pickup element 24 and in parallel with each other.

Figure 10:
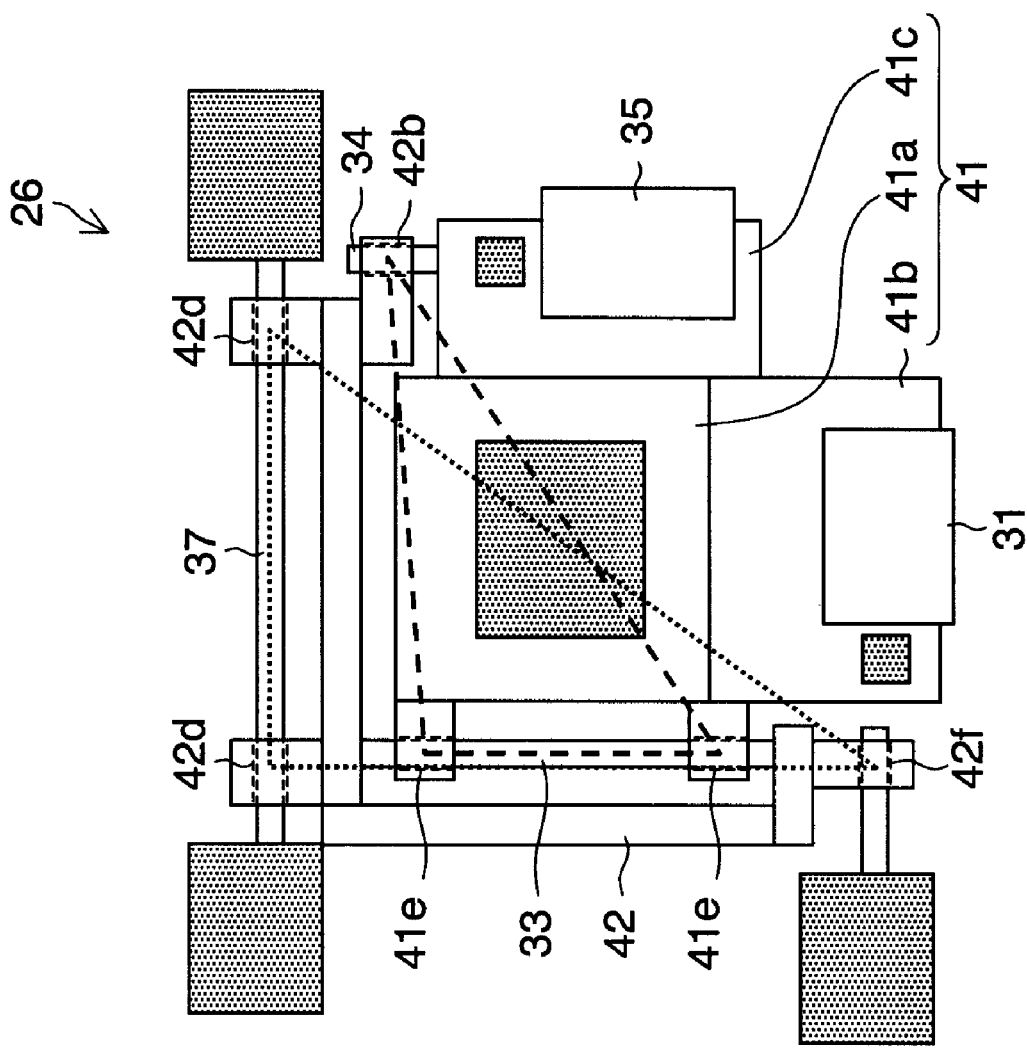
FIG. 10 is a schematic view of the image shake correction apparatus 26.

As shown by the dotted lines in FIG. 10, the moving member 41 is supported by the triangle formed by connecting the two through holes 41e and the through hole 42b with each other. The gap between the main guide shaft 33 and the through hole 41e and the gap between the rotation stop guide shaft 34 and the through hole 42b are in a range of about 0.1 microns. Thus, the inclination of the moving member 41 in the optical axis direction (z direction) is more reduced as the triangle formed by connecting the two through holes 41e and the through hole 42b with each other is made larger. In the present embodiment, the rotation stop guide shaft 34 is arranged so that the voice coil motor 35 is positioned at the tip of the projecting section 41c, that is, on the extension line of the rotation stop guide shaft 34. Thus, the triangle can be made larger as compared with the prior art form (see FIG. 17) in which all the bearings are arranged on the inner side of the slider. Therefore, the inclination of the moving member 41 can be reduced, so that the moving member 41 can be stably held and moved, that is the system can be stabilized. Note that in order to increase the size of the triangle, it is preferred that the distance between the two bearings 41d is increased as much as possible.

Further, as shown in FIG. 9, the slider 42 is not provided between the voice coil motor 35 and the moving member 41. Thus, the size of the moving member 41, that is, the size of the image shake correction apparatus 26 can be reduced as compared with the case where the voice coil motor 35 and the slider 42 are adjacent to each other in the x direction.

The slider 42 is a substantially L-shaped member, and is arranged to face the voice coil motor 31 and the voice coil motor 35 so as to sandwich the image pickup element 24 with the voice coil motor 31 and the voice coil motor 35. The slider 42 moves the image pickup element 24 in the x direction by moving the moving member 41 in the x direction. A bearing 42a is formed near the right end of the slider 42, and the through hole 42b is formed through the bearing 42a. Two bearings 42c are formed near both upper ends (+y direction) of the slider 42, and a through hole 42d is formed in each of the bearings 42c. A bearing 42e is formed near a lower end of the slider 42, and a through hole 42f is formed through the bearing 42e.

The slider 42 has the substantially L-shape and is arranged to face the voice coil motor 31 and the voice coil motor 35. Thus, the voice coil motor 35 and the slider 42 are not adjacent to each other in the x direction, and the voice coil motor 31 and the slider 42 are not adjacent to each other in the y direction. Therefore, as compared with the case where the slider has substantially square shape, the distance between the voice coil motor and the image pickup element can be reduced by the amount corresponding to the slider, so that the projecting sections 41b and 41c can be reduced in size, that is, the image shake correction apparatus 27 can be reduced in size.

The main guide shaft 37, which is a shaft for moving the slider 42 in the x direction, is inserted into the through holes 42d respectively formed through the bearings 42c, and is be fixed to the fixing member 40. When the through hole 42d is moved along the main guide shaft 37, the slider 42 is moved in the x direction.

The rotation stop guide shaft 38, which prevents the slider 42 from being rotated about the central axis of the main guide shaft 37 and the through hole 42d, is inserted into the through hole 42f formed through the bearing 42e, so as to be fixed to the fixing member 40. The main guide shaft 37 and the rotation stop guide shaft 38 are arranged on both sides of the image pickup element 24 and in parallel to each other.

As shown by the fine-dot lines in FIG. 10, the slider 42 is supported by the triangle formed by connecting the through holes 42d and through hole 42f with each other. The gap between the main guide shaft 37 and the through hole 42d and the gap between the rotation stop guide shaft 38 and the through hole 42f are in a range of about 0.1 microns. Thus, the inclination of the slider 42 in the optical axis direction (z direction) is more reduced as the triangle formed by connecting the through holes 42d and the through hole 42f with each other is made larger. In the present embodiment, the bearings 42c and the bearing 42e are formed in the vicinity of the three corner sections of the substantially L-shaped slider 42, and also the rotation stop guide shaft 38 is arranged so that the voice coil motor 31 is positioned on the extension line of the rotation stop guide shaft 38. Thereby, the triangle can be made larger as compared with the prior art form (see FIG. 17) in which the rotation stop guide shaft 38 is arranged on the inner side of the voice coil motor. Therefore, the slider 42 can be reduced in size, that is, the image shake correction apparatus 26 can be reduced in size. In addition, the inclination of the slider 42 can be reduced, so that the slider 42 can be stably held and moved, that is, the system can be stabilized.

Further, the voice coil motors 35 and 31 are respectively arranged on the extension lines of the rotation stop guide shafts 34 and 38. Thereby, the force is equally applied to the main guide shafts 33 and 37 and the rotation stop guide shafts 34 and 38 as compared with the case where the voice coil motors 31 and 35 are arranged on the outer side of the rotation stop guide shaft. Thus, the moving member 30 and the slider 39 can be stably moved.

Further, since the slider 42 is not provided between the voice coil motor 31 and the image pickup element 24, the distance between the voice coil motor and the image pickup element can be reduced, as compared with the case where the voice coil motor 31 and the slider 39 are adjacent to each other in the y direction. Thereby, the moving member 41 and the slider 42 can be reduced in size, that is, the image shake correction apparatus 26 can be reduced in size.

Further, the size of the image shake correction apparatus 26 is reduced, and at the same time, the weight of the image shake correction apparatus 26 is reduced. Thus, the thrust force required for the driving can be reduced. Thereby, the size of the magnet 35b and the coil 35c can be reduced, and the magnetic field strength can be reduced. Therefore, even when the distance between each of the voice coil motors 31 and 35, and the image pickup element 24 is reduced so that the image pickup element 24 and the magnet 35b are arranged close to each other, the influence of the noise due to the magnetic force is small.

According to the present embodiment, the image shake correction apparatus can be further reduced in size by forming the slider into the substantially L-shape.

Further, according to the present embodiment, the main guide shaft, the rotation stop guide shaft, and the three bearings are arranged so as to enlarge the triangle formed by connecting, with each other, the three points (three bearings) which support each of the moving member and the slider. Thereby, the inclination of the moving member and the slider can be reduced, and the system can be stabilized. Accordingly, the moving member and the slider can be stably moved, so that the anti-vibration performance can be improved.

Further, according to the present embodiment, the image shake correction apparatus can be further reduced in size and thereby can be reduced in weight. Therefore, the thrust force required for the movement and the frictional force at the time of the movement can be reduced, and hence the energy efficiency of the image shake correction apparatus can be improved.

<Third Embodiment>

In the first embodiment according to the present invention, the image shake correction apparatus is reduced in size by arranging the voice coil motor on the extension line of the rotation stop guide shaft. However, the form which can reduce the size of the image shake correction apparatus is not limited to this.

A third embodiment is a form in which the size of the image shake correction apparatus is reduced by arranging the voice coil motor on the extension line of the main guide shaft. In the following, a digital camera 3 according to the third embodiment will be described. Note that components which are the same as those of the first embodiment are designated by the same reference numerals and characters, and the description thereof is omitted. The effect of the digital camera 3 is the same as the effect of the digital camera 1, the description of the effect is omitted.

The camera body 11 of the digital camera 3 is formed into a horizontally-long rectangular box shape. On the front surface of the camera body 11, an optical system 12C and the stroboscope 14, and the like, are arranged. Further, the shutter button 15, the power supply button 16, the mode dial 17, and the like, are arranged on the upper surface of the camera body 11. On the other hand, the monitor 18, the zoom button 19, the cross button 20, the MENU/OK button 21, the DISP/BACK button 22, the reproduction button 23, and the like, are arranged on the rear surface of the camera body 11.

The details of the optical system 12C will be described in detail. The optical system 12C is configured mainly by a diaphragm, a focus lens group, a zoom lens group (not shown), the image pickup element 24, and an image shake correction apparatus 27.

Figure 11:
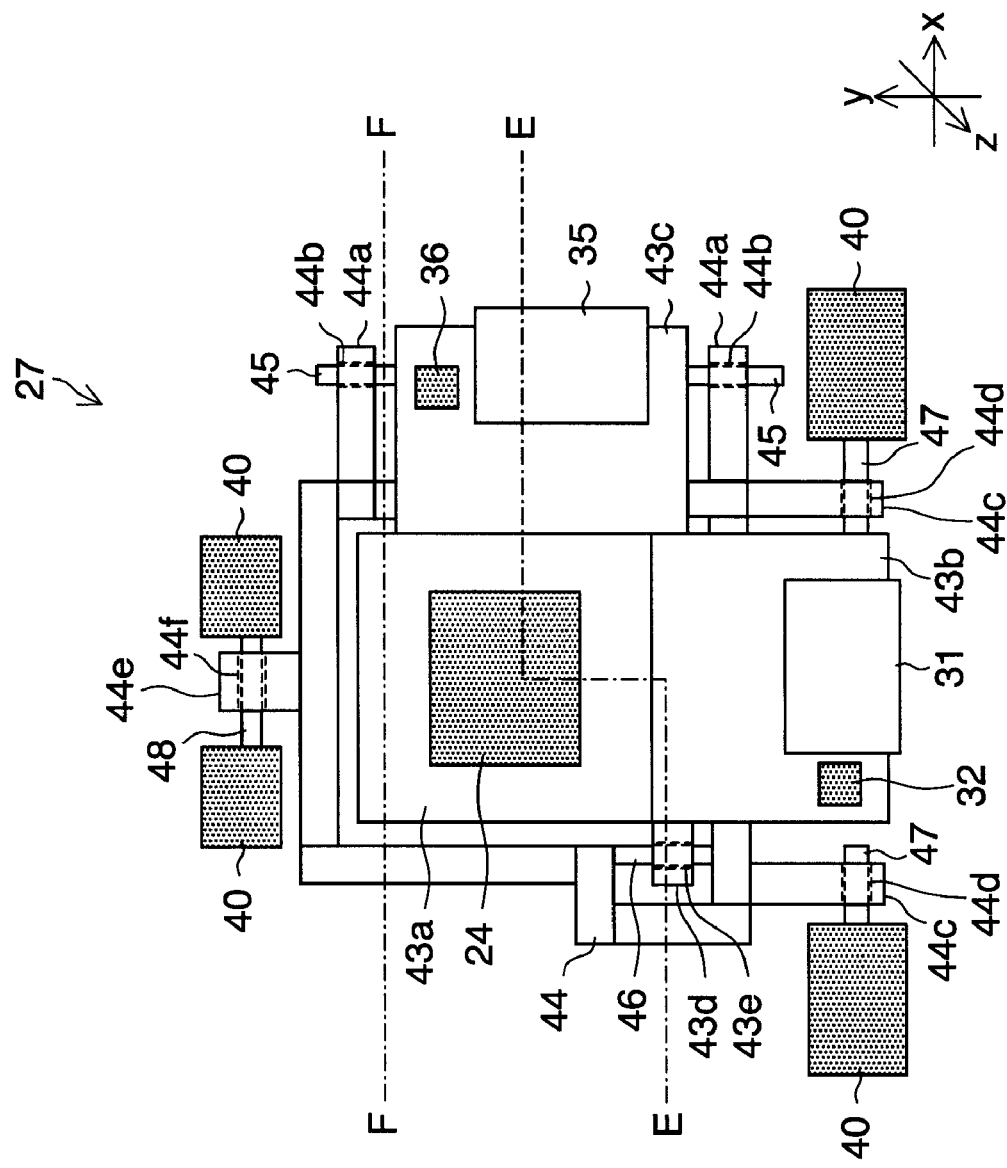
FIG. 11 is a schematic view of an image shake correction apparatus 27 of a digital camera 2 according to a third embodiment of the present invention.
Figure 12:
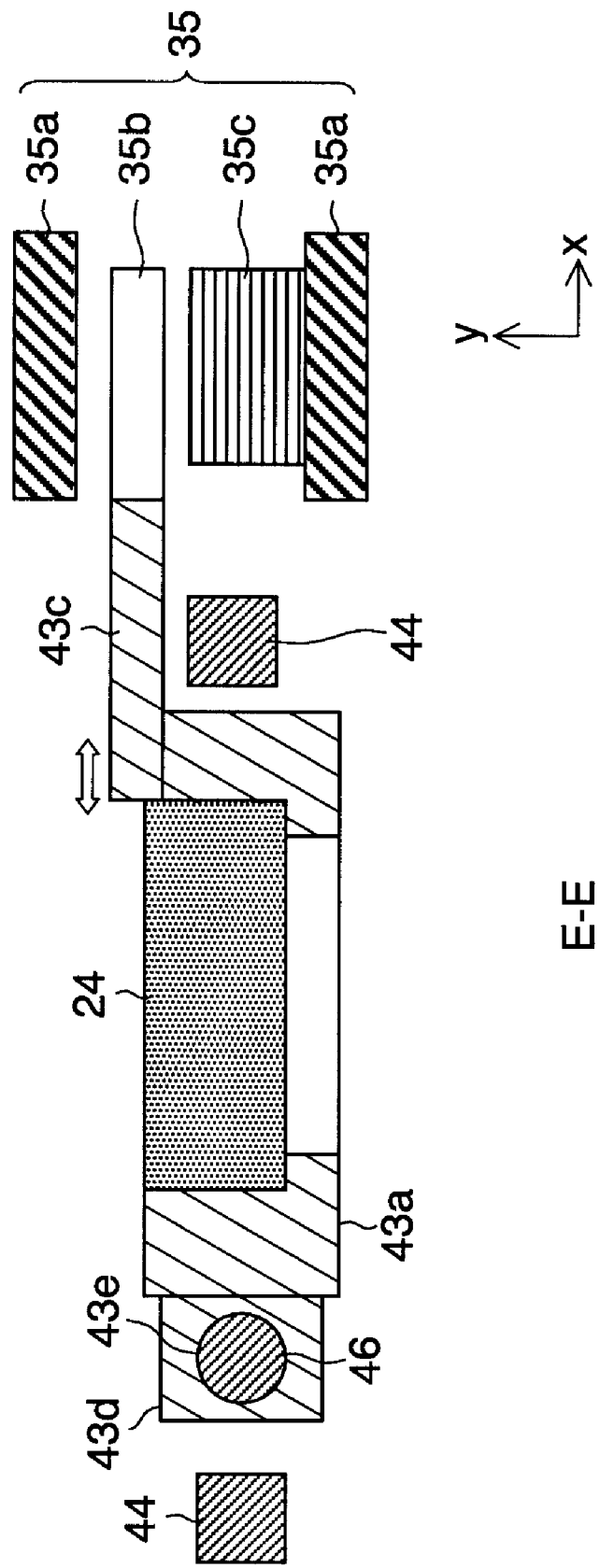
FIG. 12 is an E-E sectional view of the image shake correction apparatus 27.
Figure 13:
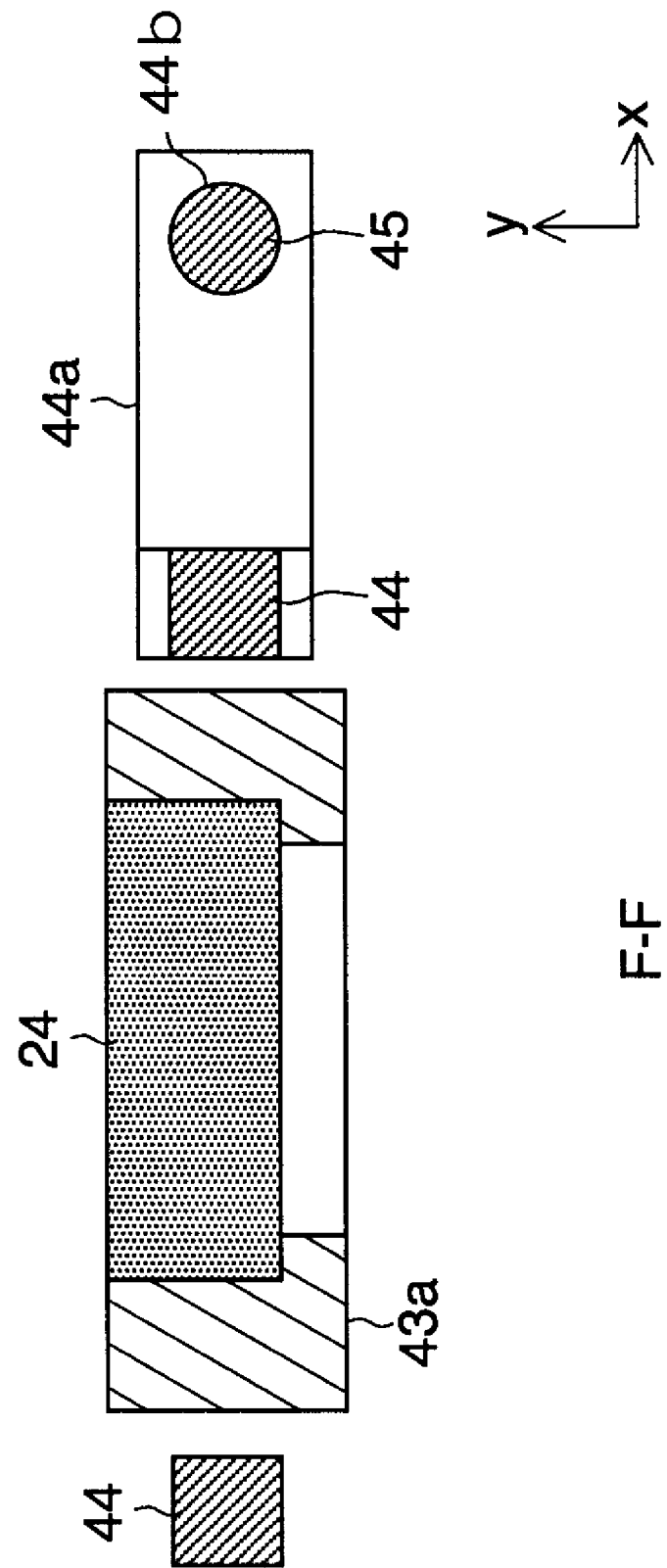
FIG. 13 is an F-F sectional view of the image shake correction apparatus 27.

FIG. 11 is a schematic view of the image shake correction apparatus 27. As shown in FIG. 11, the image shake correction apparatus 27 is configured mainly by a moving member 43, the voice coil motor 31, the position detecting element 32, a main guide shaft 45, a rotation stop guide shaft 46, the voice coil motor 35, the position detecting element 36, a main guide shaft 47, a rotation stop guide shaft 48, a slider 44, and the fixing member 40.

The moving member 43 is a substantially L-shaped member configured by a substantially rectangular main body section 43a, a projecting section 43b formed at the lower side (−y direction) of the main body section 43a, and a projecting section 43c formed at the right side (+x direction) of the main body section 43a, and moves the image pickup element 24 in the direction (x direction and y direction in FIG. 11) perpendicular to the optical axis (z direction perpendicular to the paper surface in FIG. 11). The image pickup element 24 is provided substantially at the central portion of the main body section 43a. The voice coil motor 31 and the position detecting element 32 are provided at the projecting section 43b. The voice coil motor 35 and the position detecting element 36 are provided at the projecting section 43c. The voice coil motors 31 and 35 are noise sources, and hence are respectively arranged at positions most apart from the image pickup element 24, that is, near the tip of the projecting sections 43b and 43c.

The main guide shaft 45 is formed integrally with the projecting section 43c in the vicinity of the tip of the projecting section 43c so as to project from the upper and lower end surfaces of the projecting section 43c. The main guide shaft 45 is provided so that the voice coil motor 35 is positioned on the extension line of the main guide shaft 45. A bearing 43d is formed on the left side (−x direction) of the moving member 43, and a through hole 43e is formed through the bearing 43d.

The main guide shaft 45 is a shaft for moving the moving member 43 in the y direction, and is inserted into each of through holes 44b respectively formed through bearings 44a, so as to be arranged in the upward direction (+y direction) and in the downward direction (−y direction) near the tip of the projecting section 43c. The two main guide shafts 45 are arranged on the same axis. The main guide shaft 45 moves inside the through hole 44b according to the movement of the moving member 43.

The rotation stop guide shaft 46, which prevents the moving member 43 from being rotated about the central axis of the main guide shaft 45 and the through hole 44b, is inserted into the through hole 43e formed through the bearing 43d, and is fixed to the slider 44. When the moving member 43 is moved in the y direction, the through hole 43e is moved along the rotation stop guide shaft 46. The main guide shaft 45 and the rotation stop guide shaft 46 are respectively arranged on both sides of the image pickup element 24 and in parallel with each other.

Figure 14:
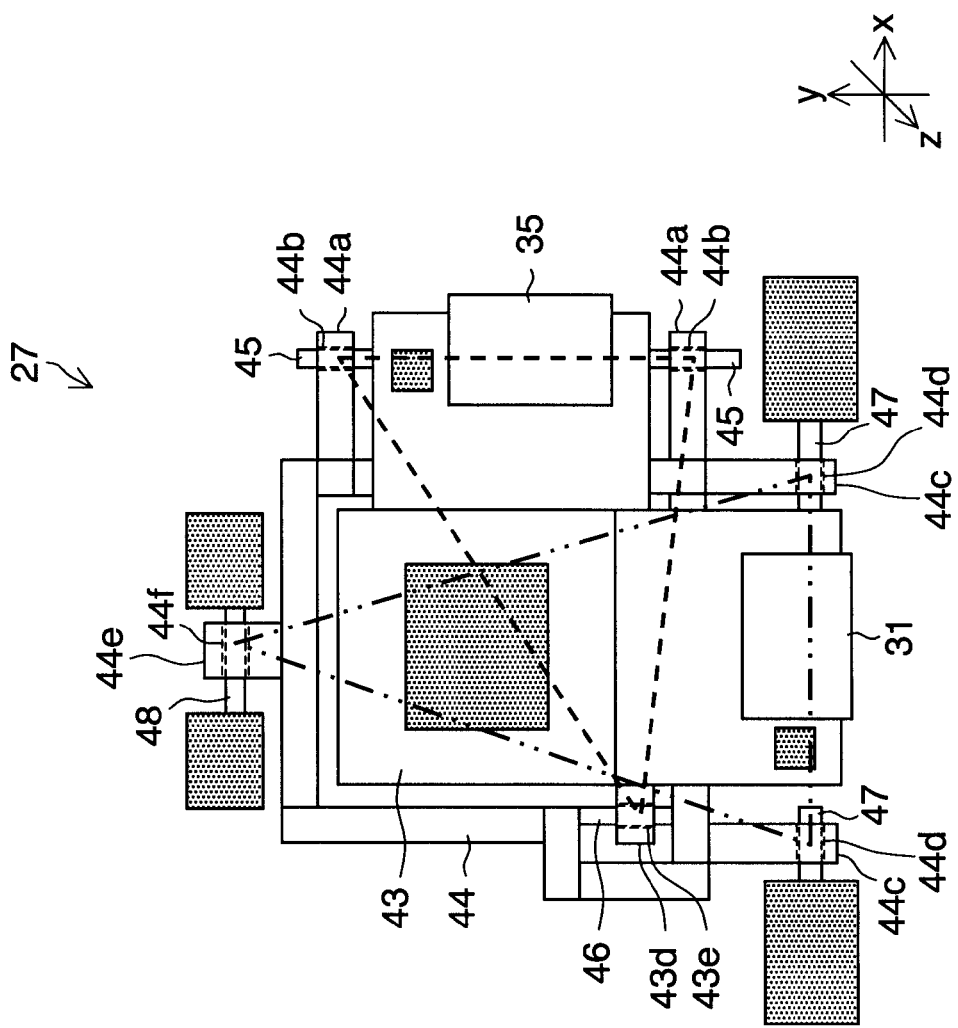
FIG. 14 is a schematic view of the image shake correction apparatus 27.

As shown by the dotted lines in FIG. 14, the moving member 43 is supported by the triangle formed by connecting the through hole 43e and the two through holes 44b with each other. The gap between the main guide shaft 45 and the through hole 44b and the gap between the rotation stop guide shaft 46 and the through hole 43e are in a range of about 0.1 microns. Thus, the inclination of the moving member 43 in the optical axis direction (z direction) is more reduced as the triangle formed by connecting the through hole 43e and the two through holes 44b with each other is made larger. In the present embodiment, the main guide shaft 45 is arranged so that the voice coil motor 35 is positioned at the tip of the projecting section 43c of the moving member 43, that is, on the extension line of the main guide shaft 45. Thus, the triangle can be made larger as compared with the prior art form (see FIG. 17) in which the rotation stop guide shaft is arranged between the voice coil motor and the image pickup element. Therefore, the inclination of the moving member 43 can be reduced, so that the moving member 43 can be stably held and moved, that is, the system can be stabilized. Note that in order to increase the size of the triangle as much as possible, the two main guide shafts 45 are respectively arranged on both upper and lower end surfaces near the tip of the projecting section 43c of the moving member 43.

Further, since the voice coil motor 35 is arranged on the extension line of the main guide shaft 45, the moving member 43, that is, the image shake correction apparatus 27 can be reduced in size by the amount corresponding to the rotation stop guide shaft, as compared with the prior art form (see FIG. 17) in which the voice coil motor 35 and the rotation stop guide shaft 46 are arranged side by side in the x direction.

The slider 44 is a member having a substantially square shape, and moves the image pickup element 24 in the x direction together with the moving member 43. Near both ends of the right side (+x direction) of the slider 44, the bearings 44a are arranged so as to sandwich both sides of the projecting section 43c, and the through hole 44b is formed through each of the bearings 44a. Near both ends of the lower side (-y direction) of the slider 44, bearings 44c are respectively formed at two positions so as to sandwich both sides of the projecting section 43b, and a through hole 44d is formed through each of the bearings 44c. At the substantially central portion on the upper side (+y direction) of the slider 44, a bearing 44e is formed, and a through hole 44f is formed through the bearing 44e.

Each of the main guide shafts 47 is a shaft for moving the slider 44 in the x direction, and is inserted into the through hole 44d formed through the bearing 44c, so as to be fixed to the fixing member 40 at a position below (-y direction) the image pickup element 24. The two main guide shafts 47 are arranged on the same axis. When the bearing 44c is moved along the main guide shaft 47, the slider 44 is moved in the x direction.

The rotation stop guide shaft 48, which prevents the slider 44 from being rotated about the central axis of the main guide shaft 47 and the through hole 44d, is inserted into the through hole 44f formed through the bearing 44e, and is fixed to the fixing member 40. When the slider 44 is moved in the x direction, the bearing 44e is moved along the rotation stop guide shaft 48. The main guide shaft 45 and the rotation stop guide shaft 46 are respectively arranged on both sides of the image pickup element 24 and in parallel to each other.

As shown by the two-dot chain lines in FIG. 14, the slider 44 is supported by the triangle formed by connecting the through holes 44d and through hole 44f with each other. The gap between the main guide shaft 47 and the through hole 44d and the gap between the rotation stop guide shaft 48 and the through hole 44f are in a range of about 0.1 microns. Thus, the inclination of the slider 44 in the optical axis direction (z direction) is more reduced as the triangle formed by connecting the through holes 44d and the through hole 44f with each other is made larger. In the present embodiment, the bearings 44c are arranged so as to position on both sides of the moving member 43, and also the voice coil motor 31 is arranged so as to position on the extension line of the main guide shaft 47. Thereby, the triangle can be made larger as compared with the prior art form (see FIG. 17) in which the rotation stop guide shaft 48 is arranged on the inner side of the voice coil motor. For this reason, the slider 44 can be reduced in size, that is, the image shake correction apparatus 27 can be reduced in size by the amount corresponding to the rotation stop guide shaft. In addition, the inclination of the slider 44 can be reduced, so that the slider 44 can be stably held and moved, that is, the system can be stabilized.

Further, the voice coil motors 35 and 31 are respectively arranged on the extension lines of the main guide shafts 45 and 47, and hence the force is equally applied to the main guide shafts 45 and 47 and the rotation stop guide shafts 46 and 48 as compared with the case where the voice coil motors 31 and 35 are arranged on the outer side of the rotation stop guide shaft. Thus, the moving member 43 and the slider 44 can be stably moved.

According to the present embodiment, not only when the voice coil motor is arranged on the extension line of the rotation stop guide shaft, but also when the voice coil motor is arranged on the extension line of the main guide shaft, the image shake correction apparatus can be reduced in size as compared with the prior art form.

Further, according to the present embodiment, the main guide shaft, the rotation stop guide shaft, and the three bearings are arranged so as to enlarge the triangle formed by connecting, with each other, the three points (three bearings) which support each of the moving member and the slider. Thereby, the inclination of the moving member and the slider can be reduced, so that the system can be stabilized. As a result, the moving member and the slider can be stably moved, so that the anti-vibration performance can be improved.

Further, according to the present embodiment, the image shake correction apparatus can be further reduced in size and thereby can be reduced in weight. Thus, the thrust force required for the movement and the frictional force at the time of the movement can be reduced, and hence the energy efficiency of the image shake correction apparatus can be improved.

In the present invention, an image shake is corrected by moving the image pickup element 24. However, the portion to be moved is not limited to the image pickup element 24, and the correction lens, or the like, may also be moved.

Figure 15:
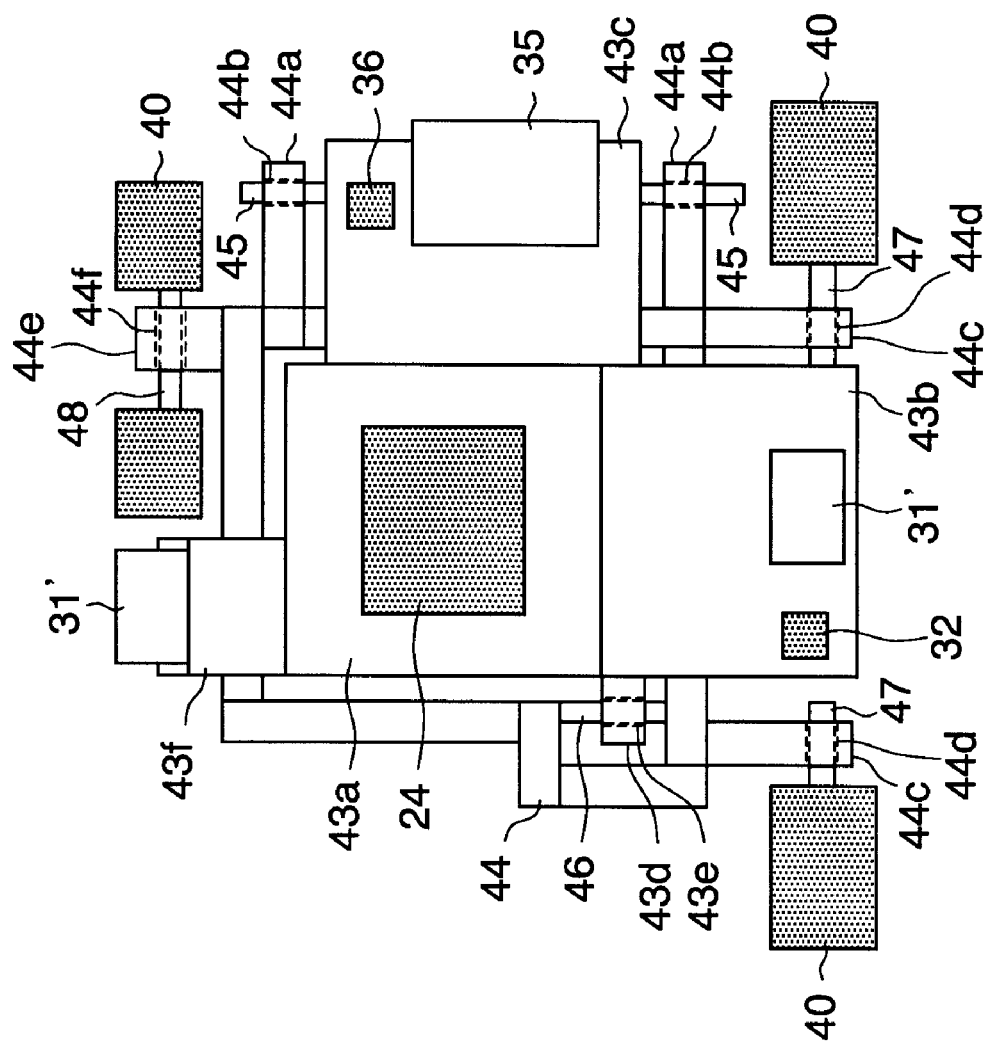
FIG. 15 is a schematic view of an image shake correction apparatus according to the present invention, in the case where two voice coil motors are used.
Figure 16:
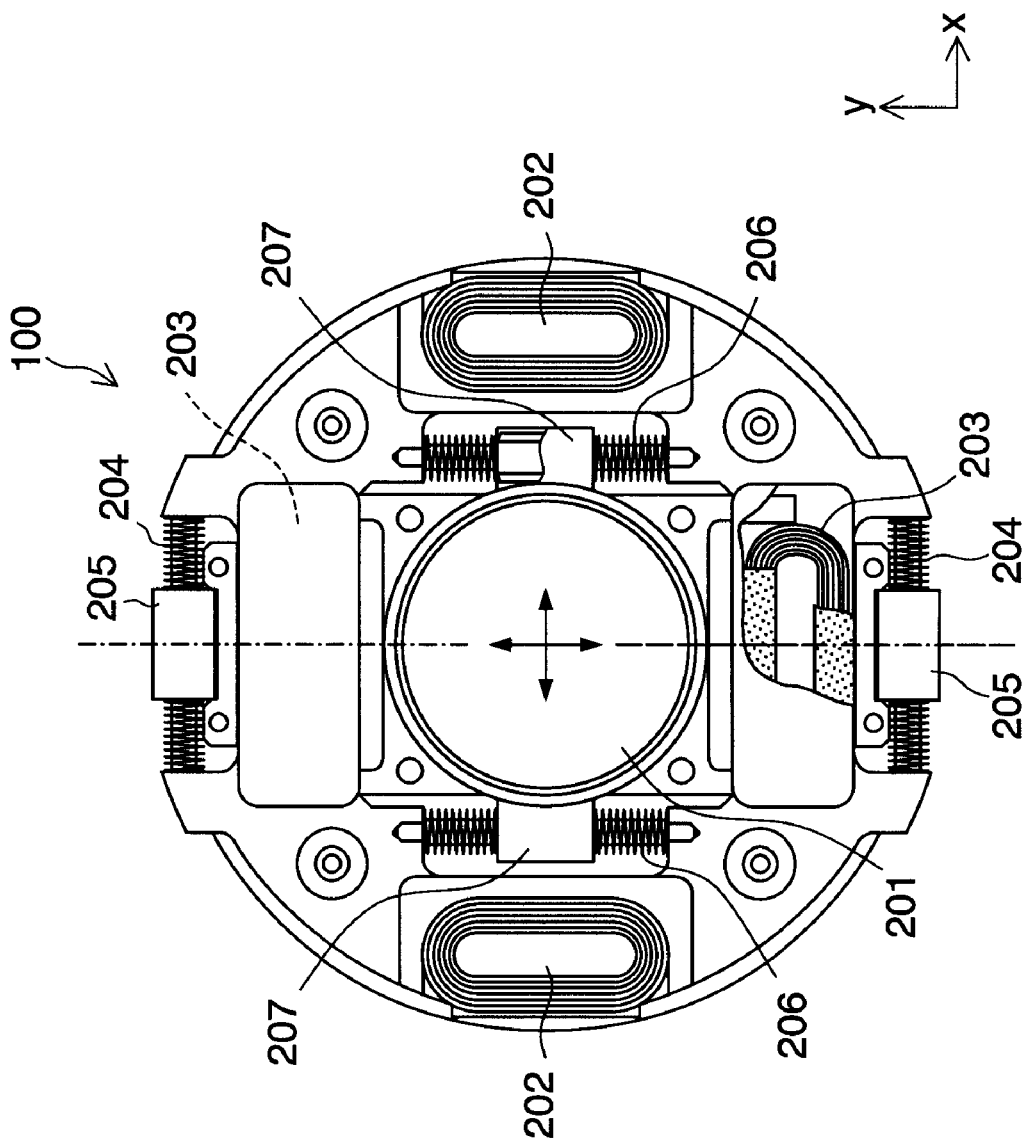
FIG. 16 is a schematic view of a conventional image shake correction apparatus.

Further, in the present invention, the one voice coil motor 31 is used to move the moving member, and the one voice coil motor 35 is used to move the slider. However, the number of the voice coil motors used to move each of the moving member and the slider is not limited to one. For example, two voice coil motors may be used to move the moving member, and two voice coil motors may be used to move the slider. In this case, as shown in FIG. 15, it may be configured such that a projecting section 43f is formed at the upper side (+y direction) of the main body section 43a, and such that voice coil motors 31' for moving the moving member 43 in the y direction are provided at the projecting sections 43b and 43f, respectively. The moving member 43 is moved in the y direction by using the two voice coil motors 31', and hence the size of each of the voice coil motors 31' can be made smaller than that of the voice coil motor 31. Therefore, even in the case where the two voice coil motors 31' are used, the size of the entire apparatus is not increased.

The present invention can be applied not only to a digital camera but also to all image pickup apparatuses, such as a video camera, which perform imaging by being held by hands. Further, the present invention can be applied not only to a digital camera which images a still image but also to an image pickup apparatus which can image a moving image and a live view image.

What is claimed is:
1. An image shake correction apparatus, comprising:
a correction optical system which corrects a camera shake;
a moving member in which the correction optical system is provided;
two first guide shafts by which the moving member is held so as to be movable in parallel with a first direction perpendicular to an optical axis;
a first voice coil motor which is provided at the moving member and which moves the moving member in the first direction;
a slider to which the two first guide shafts are fixed;
two second guide shafts by which the slider is held so as to be movable in parallel with a second direction perpendicular to the optical axis and the first direction; and a second voice coil motor which is provided at the moving member and which moves the slider in the second direction, wherein the second voice coil motor is provided on the extension line of at least one of the two first guide shafts, wherein the slider is formed into a square shape and arranged so as to overlap with the moving member in the optical axis direction.

2. The image shake correction apparatus according to claim 1, wherein the first voice coil motor is provided on the extension line of at least one of the two second guide shafts.

3. An image shake correction apparatus, comprising:
a correction optical system which corrects a camera shake;
a moving member in which the correction optical system is provided;
two first guide shafts by which the moving member is held so as to be movable in parallel with a first direction perpendicular to an optical axis;
a first voice coil motor which is provided at the moving member and which moves the moving member in the first direction;
a slider to which the two first guide shafts are fixed;
two second guide shafts by which the slider is held so as to be movable in parallel with a second direction perpendicular to the optical axis and the first direction; and
a second voice coil motor which is provided at the moving member and which moves the slider in the second direction,
wherein the second voice coil motor is provided on the extension line of at least one of the two first guide shafts,
wherein the moving member is a L-shaped member configured by a rectangular main body section and two projecting sections respectively provided at the two mutually adjacent sides of the main body section,
wherein the correction optical system is provided at the main body section,
wherein the first voice coil motor is provided at one of the two projecting sections, and
wherein the second voice coil motor is provided at the projecting section at which the first voice coil motor is not provided.

4. The image shake correction apparatus according to claim 1,
wherein a bearing is formed at the moving member so as to face the projecting section at which the second voice coil motor is provided, and
wherein one of the two first guide shafts is inserted into the bearing.

5. The image shake correction apparatus according to claim 1, wherein a first bearing, through which the second guide shaft is inserted to allow the first voice coil motor to be provided on the extension line of the second guide shaft, is formed toward the outer side of one desired side of the slider.

6. An image shake correction apparatus, comprising:
a correction optical system which corrects a camera shake;
a moving member in which the correction optical system is provided;
two first guide shafts by which the moving member is held so as to be movable in parallel with a first direction perpendicular to an optical axis;
a first voice coil motor which is provided at the moving member and which moves the moving member in the first direction;
a slider to which the two first guide shafts are fixed;
two second guide shafts by which the slider is held so as to be movable in parallel with a second direction perpendicular to the optical axis and the first direction; and
a second voice coil motor which is provided at the moving member and which moves the slider in the second direction,
wherein the second voice coil motor is provided on the extension line of at least one of the two first guide shafts.,
wherein the slider is formed into a L-shape and is arranged so as to face the first voice coil motor and the second voice coil motor.

7. The image shake correction apparatus according to claim 6, wherein a second bearing, through which the second guide shaft is inserted to allow the first voice coil motor to be provided on the extension line of the second guide shaft, is formed toward the outer side at the tip of one desired side of the slider.

8. The image shake correction apparatus according to claim 1, wherein the correction optical system is an image pickup element.

9. An image pickup apparatus, comprising:
the image shake correction apparatus according to claim 8; and
an imaging optical system which forms a subject image on the image pickup element.

* * * * *